(12) United States Patent
Li et al.

(10) Patent No.: US 11,665,264 B2
(45) Date of Patent: May 30, 2023

(54) COMMUNICATION PROTECTION METHOD FOR SENSING COMMMUNICATION AND UPDATING OR SKIPPING UPDATING A NAV ACCORDINGLY, AND APPARATUS THEREFOR

(71) Applicant: Huawei Technologies Co., Ltd., Shenzhen (CN)

(72) Inventors: Yunbo Li, Shenzhen (CN); Ming Gan, Shenzhen (CN); Mao Yang, Xi'an (CN); Zhongjiang Yan, Xi'an (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 17/646,962

(22) Filed: Jan. 4, 2022

(65) Prior Publication Data

US 2022/0131956 A1 Apr. 28, 2022

Related U.S. Application Data

(63) Continuation of application No. PCT/CN2020/100269, filed on Jul. 3, 2020.

(30) Foreign Application Priority Data

Jul. 5, 2019 (CN) .......................... 201910606221.6

(51) Int. Cl.
*H04L 69/14* (2022.01)
*H04W 74/04* (2009.01)
*H04W 74/08* (2009.01)

(52) U.S. Cl.
CPC ............. *H04L 69/14* (2013.01); *H04W 74/04* (2013.01); *H04W 74/0816* (2013.01)

(58) Field of Classification Search
CPC ......... H04L 69/14; H04L 12/14; H04L 45/24; H04W 74/04; H04W 74/0816; H04W 74/02; H04W 74/0825; H04W 74/0833
See application file for complete search history.

(56) References Cited

U.S. PATENT DOCUMENTS

2013/0229995 A1* 9/2013 Cai ....................... H04W 72/56
370/329
2019/0200387 A1 6/2019 Chitrakar et al.
(Continued)

FOREIGN PATENT DOCUMENTS

CN 107926055 * 8/2015
CN 10691208 * 12/2015
(Continued)

OTHER PUBLICATIONS

Patil, A. et al., "Multi-Link Operation: Design Discussion", IEEE 802.11-19/0823r0, May 2, 2019, 11 pages.
(Continued)

*Primary Examiner* — Mewale A Ambaye
(74) *Attorney, Agent, or Firm* — Slater Matsil, LLP

(57) ABSTRACT

An ML entity senses a first PPDU on a first fink; and if the first PPDU is an intra-BSS PPDU, and a value of a duration field of the first PPDU is greater than a value of a target NAV of a second link, the ML entity updates the value of the target NAV of the second link to the value of the duration field of the first PPDU, where the second link is any one of a plurality of links supported by the ML entity other than the first link.

17 Claims, 24 Drawing Sheets

(56) References Cited

U.S. PATENT DOCUMENTS

| | | | |
|---|---|---|---|
| 2020/0359418 A1 | 11/2020 | Kim et al. | |
| 2021/0160958 A1* | 5/2021 | Patil | H04L 1/1614 |
| 2021/0282186 A1* | 9/2021 | Ch | H04W 74/006 |
| 2021/0410163 A1* | 12/2021 | Xia | H04W 72/1268 |

FOREIGN PATENT DOCUMENTS

| | | | |
|---|---|---|---|
| CN | 106912108 A | 6/2017 | |
| CN | 107409430 A | 11/2017 | |
| CN | 107659964 A | 2/2018 | |
| CN | 107926055 A | 4/2018 | |
| CN | 109891998 A | 6/2019 | |
| EP | 3749040 A1 | 12/2020 | |
| JP | 2014502453 A | 1/2014 | |
| JP | 2016213568 A | 12/2016 | |
| JP | 2017530610 A | 10/2017 | |
| JP | 2018516018 A | 6/2018 | |
| WO | 2017183917 A1 | 10/2017 | |

OTHER PUBLICATIONS

IEEE Computer Society, "Draft Standard for Information technology—Telecommunications and information exchange between systems Local and metropolitan area networks—Specific requirements—Part 11: Wireless LAN Medium Access Control(MAC) and Physical Layer (PHY) Specifications, Amendment 6: Enhancements for High Efficiency WLAN", IEEE P802.11ax™/D2.2, Feb. 2018, 620 pages.

Seok, Y. et al. "EHT Multi-link Operation", IEEE 802.11-19/0731r0, May 15, 2019, 17 pages.

IEEE Standards Association, IEEE Standard for Information technology—Telecommunications and information exchange between systems Local and metropolitan area networks—Specific requirements, Part 11: Wireless LAN Medium Access Control (MAC) and Physical Layer (PHY) Specifications, IEEE Std 802.11™-2016, Dec. 7, 2016, 3534 pages.

* cited by examiner

| L-STF | L-LTF | L-SIG | RL-SIG | HE-SIG-A | HE-STF | HE-LTF | ... | HE-LTF | DATA | PE |

FIG. 2

ML non-AP entity 1

ML non-AP entity 2

ML AP entity

| Frame control | Duration | Receiving address | Transmitting address | ML transmission time length | Frame check sequence |

COMMUNICATION PROTECTION METHOD FOR SENSING COMMMUNICATION AND UPDATING OR SKIPPING UPDATING A NAV ACCORDINGLY, AND APPARATUS THEREFOR

CROSS-REFERENCE TO RELATED APPLICATIONS

This application is a continuation of International Application No. PCT/CN2020/100269, filed on Jul. 3, 2020, which claims priority to Chinese Patent Application No. 201910606221.6, filed on Jul. 5, 2019. The disclosures of the aforementioned applications are hereby incorporated by reference in their entireties.

TECHNICAL FIELD

This application relates to the field of communication technologies, and in particular, to a communication protection method and apparatus.

BACKGROUND

To achieve a technical objective of an extremely high throughput, a multi-link (ML) technology is used as one of key technologies in the Institute of Electrical and Electronics Engineers (IEEE) 802.11be standard. An ML entity supporting the ML technology can perform sending and receiving on a plurality of frequency bands, so that the ML entity can use larger bandwidth to perform data transmission. This greatly improves a throughput. A spatial path through which the ML entity performs data transmission on a frequency band may be referred to as a link.

When frequency space between a plurality of frequency bands supported by the ML entity is close, a signal being sent by the ML entity on one frequency band affects a signal being received by the ML entity on another frequency band. As a result, normal communication of the ML entity is affected. Currently, the industry has not proposed a corresponding solution to a problem that receiving and sending performed by the ML entity on a plurality of links are asynchronous.

SUMMARY

This application provides a communication protection method and apparatus, to resolve a problem that receiving and sending performed by an ML entity on a plurality of links are asynchronous.

According to a first aspect, a communication protection method is provided. The method is applied to an ML entity, and the ML entity supports a plurality of links. The method includes: The ML entity senses a first physical layer protocol data unit (PPDU) on a first link. If the first PPDU is an intra-basic service set (intra-BSS) PPDU, and a value of a duration field of the first PPDU is greater than a value of a target NAV of a second link, the ML entity updates the value of the target network allocation vector (NAV) of the second link to the value of the duration field of the first PPDU. The second link is any one of the plurality of links supported by the ML entity other than the first link.

According to the foregoing technical solution, if the ML entity senses, on the first link, the first PPDU sent by another intra-BSS station, and the value of the duration field of the first PPDU is greater than the value of the target NAV of the second link, the ML entity updates the value of the target NAV of the second link to the value of the duration field of the first PPDU, to ensure that after transmission of the first PPDU is completed, the ML entity does not send a PPDU within a time length indicated by the duration field of the first PPDU. In this way, one or more other ML entities in a same BSS does not receive a PPDU on one link and simultaneously send a PPDU on another link. In other words, it can be ensured that the another ML entity synchronously sends/receives a signal on the plurality of links.

In a possible design, the method further includes: If the first PPDU is an inter-basic service set (inter-BSS) PPDU, the ML entity does not update the value of the target NAV of the second link. Alternatively, if the first PPDU is the intra-BSS PPDU, and the value of the duration field of the first PPDU is less than or equal to the value of the target NAV of the second link, the ML entity does not update the value of the target NAV of the second link.

In a possible design, the method further includes: The ML entity senses a contention-free end (CF-End) frame on the first link. If the CF-End frame is an intra-BSS PPDU, and the value of the target NAV of the second link is updated based on the value of the duration field of the first PPDU, the ML entity sets the value of the target NAV of the second link to 0. It should be understood that the target NAV of the second link of the ML entity is updated based on the value of the duration field of the first PPDU sensed on the first link, to ensure that the ML entity does not send data on the second link. In this way, communication, on the first link, of the another ML entity in the same BSS is not affected. In this case, if the ML entity senses the CF-End frame in the same BSS on the first link, it indicates that the communication, on the first link, of the another ML entity in the same BSS has ended. Therefore, the ML entity may set the value of the target NAV to 0. This does not affect virtual carrier sensing of the ML entity on the second link by the communication on the first link, avoids delaying channel contention of the ML entity on the second link, and improves utilization of the second link by the ML entity.

In a possible design, the method further includes: If the ML entity senses no second PPDU on the first link within a preset time length, and the value of the target NAV of the second link is updated based on the value of the duration field of the first PPDU, the ML entity resets the target NAV of the second link. The second PPDU and the first PPDU are from a same station. It should be understood that, if the ML entity senses, on the first link within the preset time length, no second PPDU sent by a transmit end of the first PPDU, it indicates that the transmit end of the first PPDU may not occupy a channel on the first link. Therefore, the ML entity may initiate channel contention on the first link, to send the first PPDU on the first link. In this case, if the target NAV is updated based on the value of the duration field of the first PPDU, the ML entity resets the target NAV. This does not affect virtual carrier sensing of the ML entity on the second link by communication on the first link, avoids delaying channel contention of the ML entity on the second link, and improves utilization of the second link by the ML entity.

In a possible design, that the ML entity resets the target NAV of the second link includes: The ML entity sets the value of the target NAV of the second link to 0. Alternatively, the ML entity sets the value of the target NAV of the second link to a first value. An end moment determined by the first value is the same as an end moment determined by a second value, and the second value is a value of the target NAV before the target NAV is updated based on the value of the duration field of the first PPDU.

In a possible design, the preset time length=( )+(a transmission time length of a first PPDU response frame)+ aRxPHYStartDelay+(2*aSlotTime). aSIFSTime represents a time length of short interframe space (short interframe space, SIFS). aRxPHYStartDelay represents a time length of a preset delay. aSlotTime represents a time length of one slot.

In a possible design, the first PPDU carries a request to send (RTS) frame, and a response frame is a clear to send (CTS) frame.

In a possible design, if the ML entity is an ML non-access point (non-AP) entity, the target NAV includes one of the following cases: (1) If the ML non-AP entity configures an intra-BSS NAV and a basic NAV of the second link, the target NAV is the intra-BSS NAV; and (2) if the ML non-AP entity configures an intra-BSS NAV, a basic NAV, and a first NAV of the second link, the target NAV is the first NAV.

In a possible design, if the ML entity is an ML access point (AP) entity, the target NAV includes one of the following cases: (1) If the ML AP entity configures an intra-BSS NAV and a basic NAV of the second link, the target NAV is the intra-BSS NAV; (2) if the ML AP entity configures only an intra-BSS NAV, a basic NAV, and a first NAV of the second link, the target NAV is the first NAV; and (3) if the ML AP entity configures the first NAV and a second NAV of the second link, the target NAV is the first NAV.

According to a second aspect, a communication protection method is provided. The method is applied to an ML entity, and the ML entity supports a plurality of links. The method includes: The ML entity sends a first PPDU on a first link. The first PPDU includes a duration field, and the duration field included in the first PPDU is used to indicate a time length of a first time period. The ML entity sends a MAC frame on a second link. The media access control (MAC) frame is used to indicate a time length of a second time period, an end moment of the first time period is the same as an end moment of the second time period, an intra-BSS station on the second link is prohibited from sending a second PPDU in the second time period, and the second link is any one of the plurality of links supported by the ML entity other than the first link.

According to the foregoing technical solution, when the ML entity sends the PPDU on the first link, the ML entity sends the MAC frame on the second link, so that another station in a same BSS on the second link does not send a PPDU before the end moment of the first time period. In this way, it is ensured that the ML entity does not send the PPDU on the first link and receives a PPDU on the second link. This ensures that the ML entity can synchronously send/receive a signal on the plurality of links.

In a possible design, the MAC frame is a notification frame or a quiet time period (QTP) frame.

In a possible design, a value of a duration field of the notification frame is equal to the time length of the second time period, the duration field of the notification frame is used to set a value of an NAV maintained by the intra-BSS station, and the duration field of the notification frame is not used to set a value of an NAV maintained by an overlapping basic service set (OBSS) station.

In a possible design, the notification frame includes a duration field and a time length field, the time length field is used to set a value of an NAV maintained by the intra-BSS station, a value of the duration field is 0, and a value of the time length field is equal to the time length of the second time period.

According to a third aspect, a communication protection method is provided. The method is applied to an ML entity, and the ML entity supports a plurality of links. The method includes: The ML entity senses a start of a PPDU on a first link. The ML entity stops counting of a first backoff counter for a second link. The second link is any one of the plurality of links supported by the ML entity other than the first link. The ML entity determines whether the PPDU is an intra-BSS PPDU or an inter-BSS PPDU. If the PPDU is the intra-BSS PPDU, the ML entity continues to perform backoff on the second link after transmission of the PPDU is completed. If the PPDU is the inter-BSS PPDU, the ML entity continues to perform backoff on the second link.

According to the foregoing technical solution, after the ML entity senses the start of the PPDU on the first link, the ML entity suspends counting of the first backoff counter for the second link. When the PPDU is the intra-BSS PPDU, the ML entity continues to perform backoff after the transmission of the PPDU is completed. In this way, in a PPDU transmission process on the first link, the ML entity does not send a PPDU on the second link. This avoids a case in which another ML entity in the same BSS receives a signal on the first link and sends a signal on another link. In addition, when the ML entity determines that the PPDU is the inter-BSS PPDU, the ML entity immediately continues to perform backoff, to ensure that the ML entity can normally access a channel on the second link.

In a possible design, that the ML entity continues to perform backoff on the second link after transmission of the PPDU is completed includes: The ML entity continues to perform backoff on the second link after a first moment. The first moment is an end moment of the transmission of the PPDU. Alternatively, the ML entity continues to perform backoff on the second link after a second moment. The second moment is an end moment of transmission of a response frame corresponding to the PPDU. Alternatively, the ML entity continues to perform backoff on the second link after a third moment. The third moment is an end moment determined by the duration field of the PPDU.

In a possible design, after the ML entity stops counting of a first backoff counter for a second link, the method further includes: The ML entity configures a second backoff counter for the second link. An initial value of the second backoff counter is a current value of the first backoff counter. If the second link is in an idle state at a current moment, the ML entity subtracts a count value of the second backoff counter by 1 each time the second link is in the idle state in one slot. If the second link is in a busy state at a current moment, the ML entity waits for idle time of the second link to reach second interframe space, and after the idle time of the second link reaches the second interframe space, the ML entity subtracts a count value of the second backoff counter by 1 each time the second link is in an idle state in one slot.

In a possible design, the method further includes: The ML entity maintains the count value of the second backoff counter as 0 after the count value of the second backoff counter decreases to 0.

In a possible design, the method further includes: The ML entity resets the count value of the second backoff counter when the count value of the second backoff counter decreases to 0.

In a possible design, that the ML entity resets the count value of the second backoff counter includes: The ML entity resets the count value of the second backoff counter based on a doubled contention window. Alternatively, the ML entity resets the count value of the second backoff counter based on a contention window. Alternatively, the ML entity resets the count value of the second backoff counter based on a minimum value of a contention window.

In a possible design, if the PPDU is the inter-BSS PPDU, that the ML entity continues to perform backoff on the second link includes: If the PPDU is the inter-BSS PPDU, the ML entity updates a count value of the first backoff counter to the count value of the second backoff counter, and continues to perform backoff on the second link based on the first backoff counter. According to this design, when the ML entity determines that the PPDU is the inter-BSS PPDU, the ML entity sets the count value of the first backoff counter to the count value of the second backoff counter, so that the first backoff counter is not affected by the previous suspension. In this way, when the PPDU is the inter-BSS PPDU, a backoff procedure of the ML entity on the second link is not affected. This avoids that the ML entity is at a disadvantage in channel contention, and ensures that the ML entity uses the second link.

According to a fourth aspect, a communication protection method is provided. The method is applied to an ML non-AP entity, and the ML non-AP entity supports a plurality of links. The method includes: The ML non-AP entity senses a first PPDU on a first link. If a receive end of the first PPDU is an ML AP entity associated with the ML non-AP entity, the ML non-AP entity sends a second PPDU on a second link. The second link is any one of the plurality of links supported by the ML non-AP entity other than the first link, and an end moment of the first PPDU is the same as an end moment of the second PPDU.

According to the foregoing technical solution, if the ML non-AP entity senses the first PPDU on the first link, and the first PPDU is sent to the ML AP entity associated with the ML non-AP entity, the ML non-AP entity sends the second PPDU on the second link. Because the end moment of the second PPDU is the same as the end moment of the first PPDU, the ML AP entity may send a block acknowledgment (BA) frame of the second PPDU and a BA frame of the first PPDU at a same moment. This avoids a case in which the ML AP entity sends a signal on one link and receives a signal on another link. In addition, the ML non-AP entity sends the second PPDU on the second link, and this helps improve utilization of the second link.

In a possible design, that the ML non-AP entity sends a second PPDU on a second link includes: The ML non-AP entity performs a backoff procedure on the second link; and the ML non-AP entity sends the second PPDU on the second link after the backoff procedure performed on the second link ends.

According to a fifth aspect, an ML entity is provided. The ML entity may include modules configured to perform the methods/operations/steps/actions, one-to-one corresponding to the modules, described in any one of the designs in the first aspect to the fourth aspect. The foregoing module may be a hardware circuit or software, or may be implemented by using a hardware circuit in combination with software.

According to a sixth aspect, an ML entity is provided. The ML entity includes a processor and a transceiver. The processor is configured to perform a processing operation in the communication protection method according to any one of the designs in the first aspect to the fourth aspect. The transceiver is configured to perform, under control of the processor, a transceiver operation in the communication protection method according to any one of the designs in the first aspect to the fourth aspect.

According to a seventh aspect, a computer-readable storage medium is provided. The computer-readable storage medium is configured to store instructions. When the instructions are read by a computer, the computer is configured to perform the communication protection method according to any one of the designs in the first aspect to the fourth aspect.

According to an eighth aspect, a computer program product is provided. The computer program product includes instructions. When a computer reads the instructions, the computer performs the communication protection method according to any one of the designs in the first aspect to the fourth aspect.

According to a ninth aspect, a chip is provided. The chip includes a processing circuit and a transceiver pin. The chip supports a plurality of links. The transceiver pin is configured to sense a first PPDU on a first link. The processing circuit is configured to: when the first PPDU is an intra-BSS PPDU, and a value of a duration field of the first PPDU is greater than a value of a target NAV of a second link, update the value of the target NAV of the second link to the value of the duration field of the first PPDU. The second link is any one of the plurality of links supported by the chip other than the first link.

According to a tenth aspect, a chip is provided. The chip includes a processing circuit and a transceiver pin. The chip supports a plurality of links. The transceiver pin is configured to send a first PPDU on a first link. The first PPDU includes a duration field, and the duration field included in the first PPDU is used to indicate a time length of a first time period. The transceiver pin is further configured to send a MAC frame on a second link. The MAC frame is used to indicate a time length of a second time period, an end moment of the first time period is the same as an end moment of the second time period, an intra-BSS station on the second link is prohibited from sending a second PPDU in the second time period, and the second link is any one of the plurality of links supported by an ML entity other than the first link.

According to an eleventh aspect, a chip is provided. The chip includes a processing circuit and a transceiver pin. The chip supports a plurality of links. The transceiver pin is configured to sense a start of a PPDU on a first link. The processing circuit is configured to: stop counting of a first backoff counter for a second link, and determine whether the PPDU is an intra-BSS PPDU or an inter-BSS PPDU. When the PPDU is the intra-BSS PPDU, the processing circuit continues to perform backoff on the second link after transmission of the PPDU is completed. When the PPDU is the inter-BSS PPDU, the processing circuit continues to perform backoff on the second link. The second link is any one of the plurality of links supported by the chip other than the first link.

According to a twelfth aspect, a chip is provided. The chip includes a processing circuit and a transceiver pin. The chip supports a plurality of links. The transceiver pin is configured to sense a first PPDU on a first link. The transceiver pin is further configured to: when a receive end of the first PPDU is an associated ML AP entity, send a second PPDU on a second link. The second link is any one of the plurality of links supported by an ML non-AP entity other than the first link, and an end moment of the first PPDU is the same as an end moment of the second PPDU.

For technical effects brought by any design of the fifth aspect to the twelfth aspect, refer to beneficial effects in the corresponding method provided above. Details are not described herein again.

BRIEF DESCRIPTION OF THE DRAWINGS

FIG. 2 is a schematic diagram of a frame structure of a PPDU according to an embodiment of this application;

DETAILED DESCRIPTION OF ILLUSTRATIVE EMBODIMENTS

Figure 1:
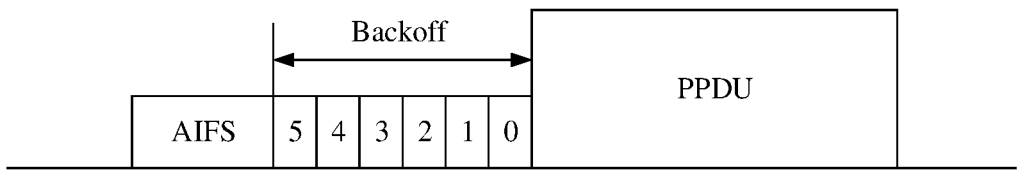
FIG. 1 is a schematic diagram of a backoff procedure according to an embodiment of this application.

In the description of this application, unless otherwise specified, "/" means "or". For example, A/B may represent A or B. The term "and/or" in this specification describes only an association relationship for associated objects and represents that three relationships may exist. For example, A and/or B may represent the following three cases: Only A exists, both A and B exist, and only B exists. In addition, "at least one" means one or more, and "a plurality of" means two or more. Words such as "first" and "second" do not limit a quantity and an execution sequence, and the words such as "first" and "second" do not indicate a definite difference.

It should be noted that in this application, the word such as "example" or "for example" is used to represent giving an example, an illustration, or description. Any embodiment or design scheme described with "for example" or as an "example" in this application should not be explained as being more preferred or having more advantages than another embodiment or design scheme. Exactly, use of the word "example" or "for example" or the like is intended to present a relative concept in a specific manner.

To facilitate understanding of the technical solutions of this application, the following first briefly describes terms used in this application.

1. Basic Service Set (BSS)

A BSS is used to describe a group of devices that can communicate with each other in a wireless local area network (WLAN). The WLAN may include a plurality of BSSs. Each BSS has a unique identifier, which is referred to as a basic service set identifier (BSSID).

One BSS may include a plurality of stations (STAs). The station includes an AP and a non-access point station (non-AP STA). Optionally, one BSS may include one AP and a plurality of non-AP STAs associated with the AP.

The AP may also be referred to as a wireless access point or a hotspot. The AP may be a wireless router, a wireless transceiver, a wireless switch, or the like.

The non-AP STA may have different names such as a subscriber unit, an access terminal, a mobile station, a mobile device, a terminal, user equipment, and the like. During actual application, the STA may be a cellular phone, a smartphone, a wireless local loop (wireless local loop, WLL), or another handheld device or computer device that has a wireless local area network communication function.

2. Backoff Mechanism

The IEEE 802.11 standard supports a plurality of users sharing a same transmission medium. A sender checks availability of the transmission medium before sending data. The IEEE 802.11 standard uses carrier sense multiple access with collision avoidance (CSMA/CA) to achieve channel contention. The CSMA/CA uses a backoff mechanism to avoid collision.

The backoff mechanism on a single channel is described below. Before a device sends a message, the device may select a random number from 0 to a contention window (CW), and use the random number as an initial value of a backoff counter. After idle time of the channel reaches arbitration interframe space (AIFS), a count value of the backoff counter is subtracted by 1 each time the channel is idle in one slot. Before the count value of the backoff counter decreases to 0, if the channel is busy in one slot, the backoff counter suspends counting. Then, if the channel changes from a busy state to an idle state and the idle time of the channel reaches the AIFS, the backoff counter resumes counting. When the count value of the backoff counter is 0, a backoff procedure ends, and the device may start data transmission.

Refer to FIG. 1. An example is used for description. It is assumed that the initial value of the backoff counter is 5, and after the idle time of the channel reaches the AIFS, the backoff counter starts to perform backoff. Each time the channel is in the idle state in one slot, the count value of the backoff counter is subtracted by 1 until the count value of the backoff counter is 0. After the count value of the backoff counter is 0, the device may send a PPDU on the channel.

3. NAV

An NAV is used in virtual carrier sensing. The NAV is equivalent to a counter, and is used to record time in which a station occupies a channel. A value of the NAV decreases with time, but before the value of the NAV decreases to 0, the station always considers that the channel is busy and stops channel contention and data sending.

Currently, a non-AP STA has two NAVs: an intra-NAV and a basic NAV. The intra-NAV is updated based on an intra-BSS PPDU. The basic NAV is updated based on an inter-BSS PPDU or based on a PPDU that cannot be classified as the intra-BSS PPDU or the inter-BSS PPDU.

An AP may have two NAVs, or may have only one NAV. When two NAVs are configured for the AP, the two NAVs of the AP are: the intra-NAV and the basic NAV.

It should be understood that in a dense deployment scenario, it is beneficial for the station to maintain the two NAVs. By maintaining the two NAVs, the station can protect a frame sent by an intra-BSS station, and can also avoid interference from the frame sent by an inter-BSS station.

4. PPDU

FIG. 2 is a schematic diagram of a frame structure of a PPDU in the 802.11ax standard. The PPDU includes a legacy short training field (L-STF), a legacy long training field (L-LTF), a legacy signal field (L-SIG), a repeated legacy signal field (RL-SIG), a high efficient signal field A (HE-SIG A), a high efficient signal field B (HE-SIG B), a high efficient short training field (HE-STF), a high efficient long training field (HE-LTF), data, and data packet extension (PE).

The L-STF is used for automatic gain control, sequence synchronization, and coarse frequency offset estimation.

5. Intra-BSS PPDU and Inter-BSS PPDU

For a station, if a BSS to which a PPDU sensed by the station belongs and a BSS associated with the station are a same BSS, or a receive end/transmit end of the PPDU sensed by the station and the station belong to a same BSS, the PPDU is an intra-BSS PPDU. For example, if a BSS color/BSS ID of the PPDU sensed by the station is the same as a BSS color/BSS ID of the BSS associated with the station, the PPDU is the intra-BSS PPDU.

For a station, if a BSS to which a PPDU sensed by the station belongs and a BSS associated with the station are not a same BSS, or a receive end/transmit end of the PPDU sensed by the station and the station do not belong to a same BSS. The PPDU is an inter-BSS PPDU. For example, if a BSS color/BSS ID of the PPDU sensed by the station is different from a BSS color/BSS ID of the BSS associated with the station, the PPDU is the inter-BSS PPDU.

The foregoing method for determining, by the station, whether the PPDU is the intra-BSS PPDU or the inter-BSS PPDU is merely an example. For details, refer to the legacy art.

6. ML Entity

An ML entity can perform sending and receiving on a plurality of frequency bands. For example, the plurality of frequency bands include but are not limited to a 2.4 GHz frequency band, a 5 GHz frequency band, and a 6 GHz frequency band. A spatial path through which the ML entity performs data transmission on a frequency band may be referred to as a link. In other words, the ML entity supports multi-link communication.

It should be understood that, for the ML entity, each link supported by the ML entity corresponds to one frequency band.

Figure 3:
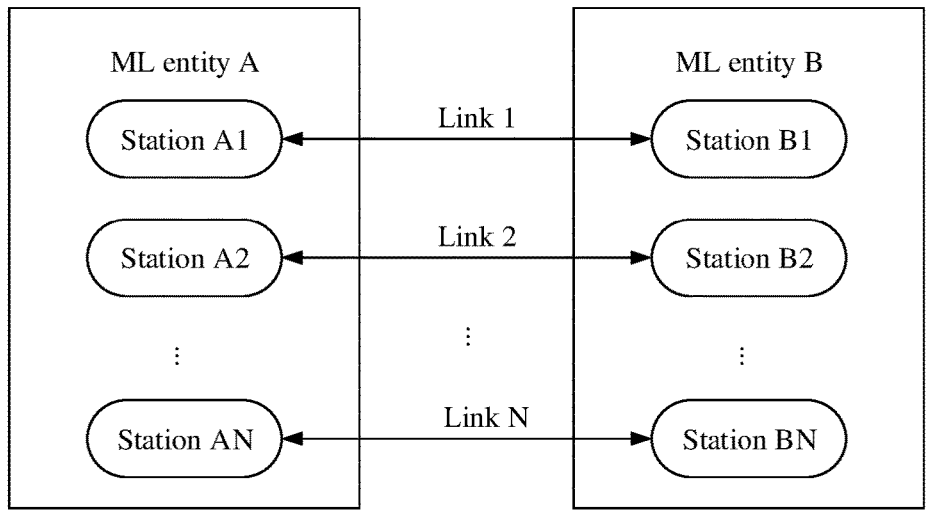
FIG. 3 is a schematic diagram of a communication scenario between ML entities according to an embodiment of this application.

The ML entity may also be referred to as an ML STA entity. The ML entity includes a plurality of STAs. Each STA in the ML entity may establish a link for communication. As shown in FIG. 3, an ML entity A includes a station A1 to a station AN, and an ML entity B includes a station B1 to a station BN. The station A1 communicates with the station B1 through a link 1, the station A2 communicates with the station B2 through a link 2, and the rest may be deduced by analogy. The station AN communicates with the station BN through a link N.

It should be noted that the plurality of STAs in the ML entity may have a same MAC address, or may have different MAC addresses. The plurality of STAs in the ML entity may be located at a same physical location, or may be located at different physical locations.

If the STA in the ML entity is an AP, the ML entity may be referred to as an ML AP entity. If the STA in the ML entity is a non-AP STA, the ML entity may be referred to as an ML non-AP STA entity or an ML non-AP entity. In this embodiment of this application, unless otherwise specified, the ML entity may be the ML AP entity, or may be the ML non-AP entity.

A non-AP STA on a link in the ML non-AP entity may be associated with an AP on the same link in the ML AP entity, so that the non-AP STA on the link in the ML non-AP entity can communicate with the AP on the same link in the ML AP entity.

It should be understood that an association relationship may be established between the ML AP entity and the ML non-AP entity, to ensure normal communication between the ML AP entity and the ML non-AP entity.

It should be noted that the association relationship between the ML AP entity and the ML non-AP entity includes an association relationship between a station of the ML AP entity on a link and a station of the ML non-AP entity on the same link.

An implementation of establishing the association relationship between the ML non-AP entity and the ML AP entity is not limited in this embodiment of this application. For example, the ML non-AP entity and the ML AP entity establish, on one link, the association relationship based on the link. Alternatively, the ML non-AP entity and the ML AP entity establish, on one link, an association relationship between the ML non-AP entity and the ML AP entity based on a plurality of links.

The ML non-AP entity and the ML AP entity establish the association relationship based on the one link. For a specific implementation thereof, refer to an implementation of establishing an association relationship between an AP and a non-AP STA in the conventional technology. Details are not described herein.

7. SL Entity

An SL entity is a STA that supports only one link. The SL entity may be a legacy (legacy) STA, namely, a STA that supports only the existing 802.11 standard but does not support the next-generation 802.11 standard.

The foregoing briefly describes the technical terms used in this application. Details are not described below.

The following uses an example to describe a case in which receiving and sending performed by an ML entity on a plurality of links are asynchronous.

Figure 4:
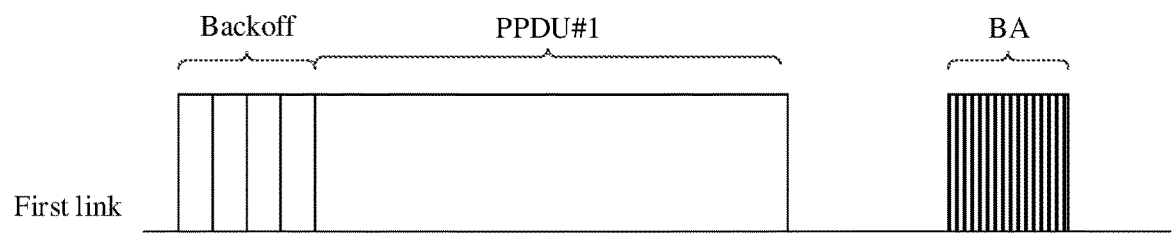
FIG. 4 is a schematic diagram of an ML communication scenario according to an embodiment of this application.
Figure 4:
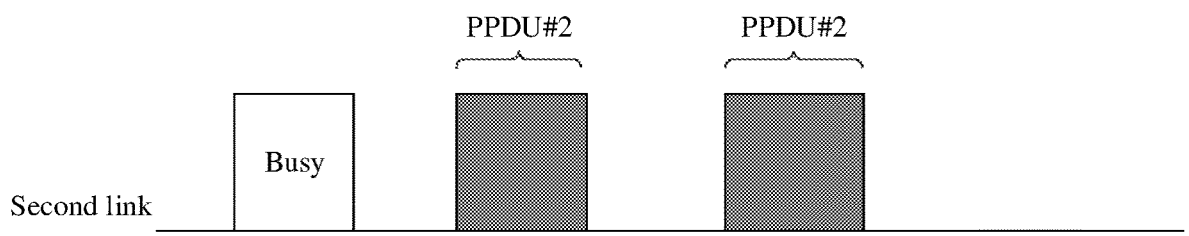
Figure 4:
Figure 4:
Figure 4:

Refer to FIG. 4. An example is used for description. An ML AP entity sends a PPDU #1 to an ML non-AP entity 1 on a first link. Because an ML non-AP entity 2 does not know that the ML AP entity is sending the PPDU #1 on the first link, the ML non-AP entity 2 may send a PPDU #2 to the ML AP entity on a second link. In this case, sending of the PPDU #1 by the ML AP entity on the first link affects receiving of the PPDU #2 by the ML AP entity on the second link. Consequently, the PPDU #2 fails to be transmitted.

Figure 5:
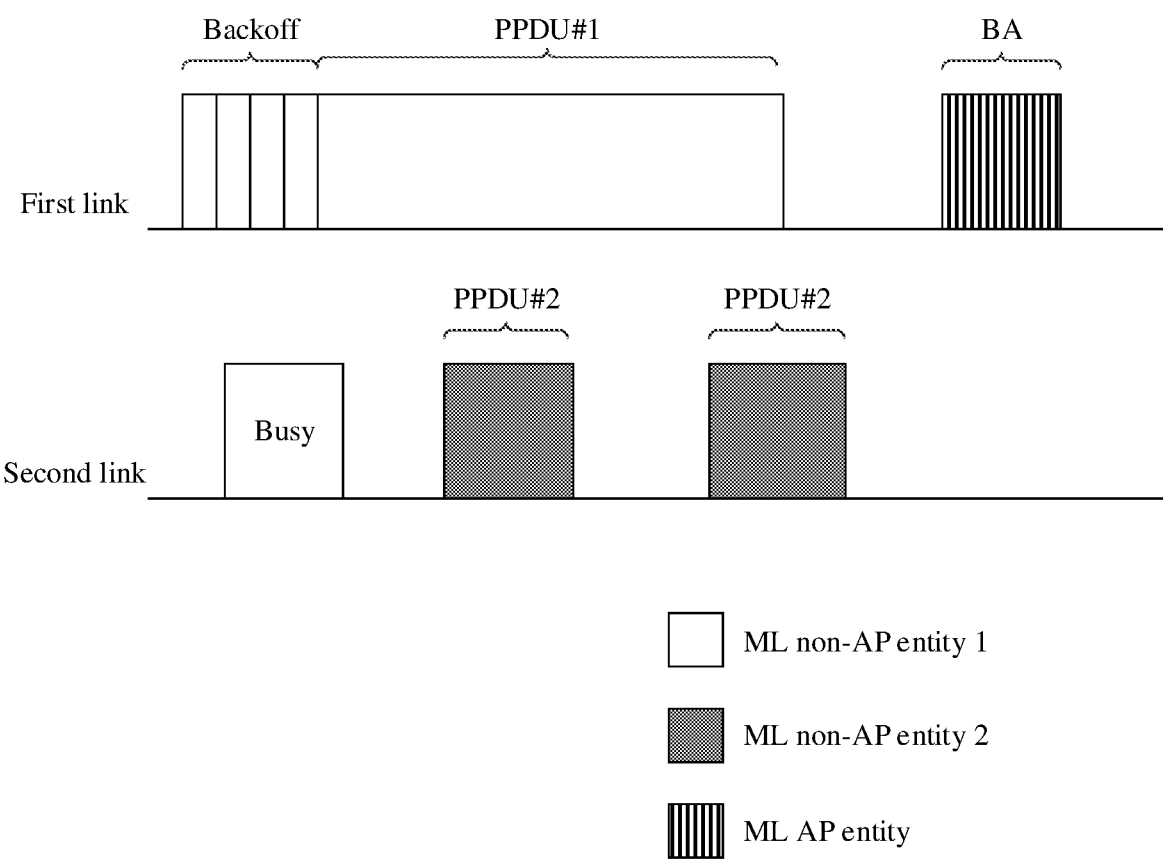
FIG. 5 is a schematic diagram of another ML communication scenario according to an embodiment of this application.

Refer to FIG. 5. An example is used for description. An ML non-AP entity 1 sends a PPDU to an ML AP entity on a first link. Because an ML non-AP entity 2 does not know that the ML non-AP entity 1 is sending the PPDU #1 on the first link, the ML non-AP entity 2 may send a PPDU #2 to the ML AP entity on a second link. Transmission time of the PPDU #2 is shorter than transmission time of the PPDU #1. If the ML AP entity sends a BA frame on the second link, receiving of the PPDU #1 by the ML entity on the first link is affected. Consequently, the PPDU #1 fails to be transmitted. If the ML AP does not send the BA frame on the second link, the ML non-AP entity 2 considers that the PPDU #2 fails to be transmitted because the ML non-AP entity 2 fails to receive the BA frame.

It should be understood that receiving and sending performed by the ML entity on a plurality of links are asynchronous specifically means that the ML entity sends a signal on a part of links, and the ML entity simultaneously receives a signal on another part of links.

Sending of a signal by the ML entity on one link affects receiving of a signal by the ML entity on another link. Consequently, it is necessary to avoid that receiving and sending performed by the ML entity on the plurality of links are asynchronous. For this technical problem, embodiments of this application provide the following technical solutions. For specific content of the technical solutions, refer to the following.

The technical solutions in this application are applied to a WLAN. A standard used for the WLAN may be the IEEE 802.11 standard, for example, the 802.11ax standard, the next-generation 802.11 standard, or the like. Scenarios to which the technical solutions of this application are applicable include: a communication scenario between ML entities and a communication scenario between an ML entity and an SL entity.

For example, the communication scenario between the ML entities may be a communication scenario between an ML non-AP entity and an ML AP entity, a communication scenario between ML non-AP entities, or a communication scenario between ML AP entities.

For example, the communication scenario between the ML entity and the SL entity may be a communication scenario between an ML non-AP entity and a legacy AP, a communication scenario between an ML AP entity and a legacy non-AP STA, a communication scenario between an ML AP entity and a legacy AP, or a communication scenario between an ML non-AP entity and a legacy non-AP STA.

The following specifically describes the technical solutions provided in the embodiments of this application with reference to accompanying drawings of the specification.

Figure 6:
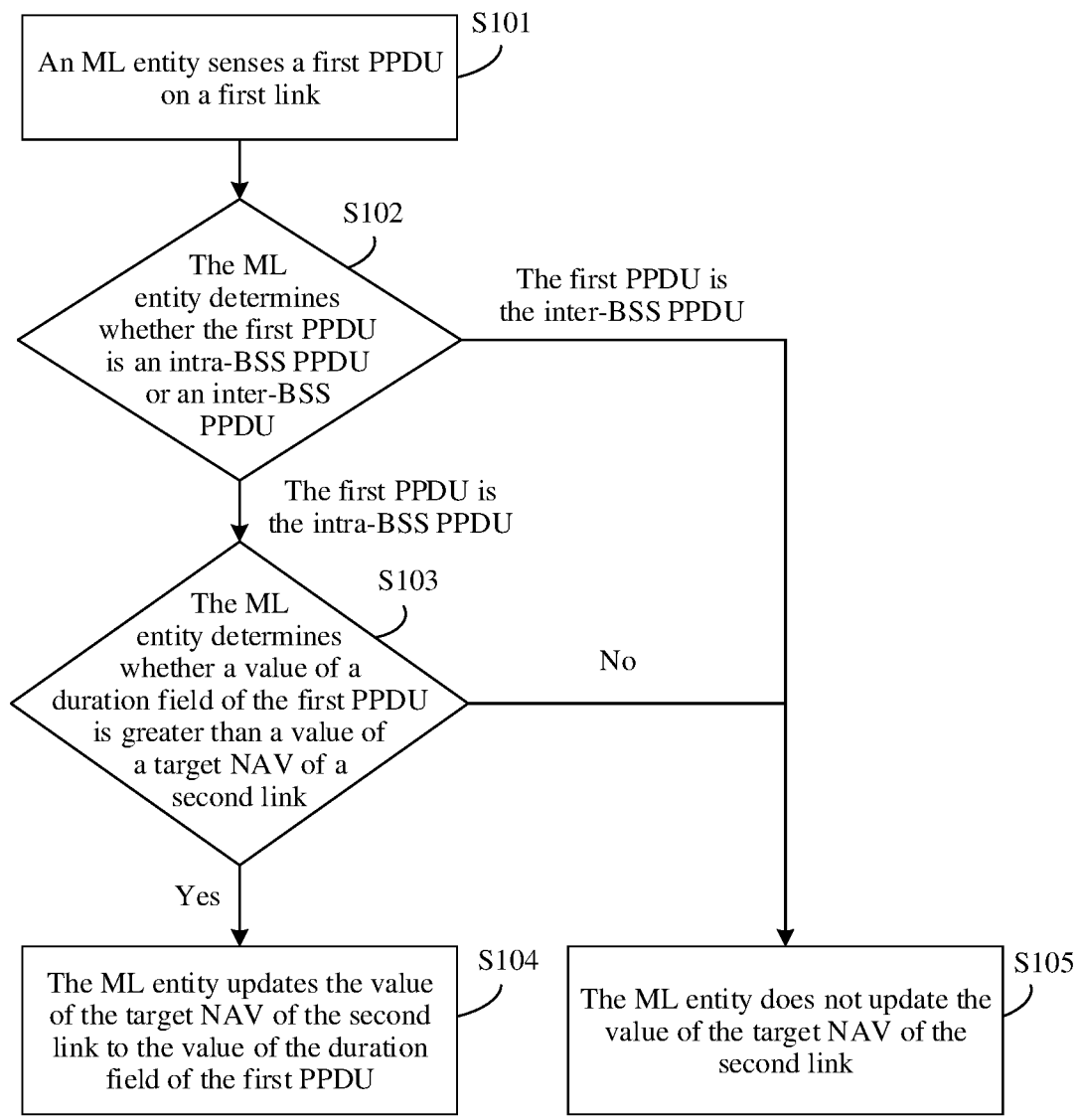
FIG. 6 is a flowchart of a communication protection method according to an embodiment of this application.

FIG. 6 shows a communication protection method according to an embodiment of this application. The method includes the following steps.

S101: An ML entity senses a first PPDU on a first link.

The ML entity may support a plurality of links. The first link is any one of the plurality of links supported by the ML entity.

In an implementation, a station of the ML entity on the first link senses the first PPDU on the first link.

S102: The ML entity determines whether the first PPDU is an intra-BSS PPDU or an inter-BSS PPDU.

In an implementation, the station of the ML entity on the first link determines whether the first PPDU is the intra-BSS PPDU or the inter-BSS PPDU. For a method for determining whether the first PPDU is the intra-BSS PPDU or the inter-BSS PPDU, refer to the conventional technology. Details are not described herein.

When the first PPDU is the intra-BSS PPDU, the ML entity performs the following step S103. When the PPDU is the inter-BSS PPDU, the ML entity performs the following step S105.

S103: When the first PPDU is the intra-BSS PPDU, the ML entity determines whether a value of a duration field of the first PPDU is greater than a current value of a target NAV of a second link.

The second link is another link in the plurality of links supported by the ML entity other than the first link. In other words, the first link and the second link are two different links.

It should be noted that the value of the duration field of the first PPDU is used to indicate time in which a transmit end of the first PPDU occupies a channel on the first link.

In this embodiment of this application, the target NAV of the second link may be used to record time in which a station is prohibited from actively initiating contention on the second link. The target NAV of the second link may reuse an NAV in a current standard, or may be a newly configured NAV.

Optionally, when the ML entity is an ML non-AP entity, the target NAV of the second link may be one of the following cases.

Case 1: The target NAV of the second link reuses an intra-NAV of the second link. In this case, the ML non-AP entity includes the intra-NAV and a basic NAV of the second link.

Case 2: The target NAV of the second link is the newly configured NAV. In this case, the ML non-AP entity includes the intra-NAV, a basic NAV, and a first NAV of the second link. The first NAV is the target NAV, and the first NAV may also be referred to as an ML NAV.

Optionally, when the ML entity is an ML AP entity, the target NAV of the second link may be one of the following cases.

Case 1: The target NAV of the second link reuses an intra-NAV of the second link. In this case, the ML AP entity includes the intra-NAV and a basic NAV of the second link.

Case 2: The target NAV of the second link is the newly configured NAV. In this case, the ML AP entity includes the intra-NAV, a basic NAV, and a first NAV of the second link. Alternatively, the ML AP entity includes a first NAV and a second NAV. The first NAV is the target NAV. The second NAV is an NAV configured by an AP in a scenario in which the AP configures only one NAV in the current standard.

It should be noted that, if the ML entity configures a plurality of NAVs of one link, a value of any one of the plurality of NAVs is not 0, and a result of virtual carrier sensing is that the link is busy. Therefore, a backoff procedure of the ML entity on the link is suspended. The ML entity cannot send a PPDU on the link.

In an implementation, the station of the ML entity on the second link obtains a result of determining whether the first PPDU is the intra-BSS PPDU by the station of the ML entity on the first link. When the first PPDU is the intra-BSS PPDU, the station of the ML entity on the second link further obtains the value of the duration field of the first PPDU from the station of the ML entity on the first link. Then, the station of the ML entity on the second link determines whether the value of the duration field of the first PPDU is greater than the current value of the target NAV of the second link.

When the value of the duration field of the first PPDU is greater than the current value of the target NAV of the second link, the ML entity performs the following step S104. When the value of the duration field of the PPDU is less than or equal to the current value of the target NAV of the second link, the ML entity performs the following step S105.

S104: When the value of the duration field of the first PPDU is greater than the value of the target NAV of the second link, the ML entity updates the value of the target NAV of the second link to the value of the duration field of the first PPDU.

In an implementation, the station of the ML entity on the second link updates the value of the target NAV of the second link to the value of the duration field of the first PPDU. For example, if the current value of the target NAV of the second link is 10, and the value of the duration field of the first PPDU is 12, the station of the ML entity on the second link updates the value of the target NAV of the second link to 12.

S105: The ML entity does not update the value of the target NAV of the second link.

In an implementation, the station of the ML entity on the second link does not update the value of the target NAV of the second link.

According to the technical solution shown in FIG. 6, if the ML entity senses, on the first link, the first PPDU sent by another intra-BSS station, and the value of the duration field of the first PPDU is greater than the value of the target NAV of the second link, the ML entity updates the value of the target NAV of the second link to the value of the duration field of the first PPDU, to ensure that after transmission of the first PPDU is completed, the ML entity does not send a PPDU within a time length indicated by the duration field of the first PPDU. In this way, another ML entity in a same BSS does not receive a PPDU on one link and simultaneously send a PPDU on another link, and normal communication of the another ML entity in the same BSS can be ensured.

Figure 7:
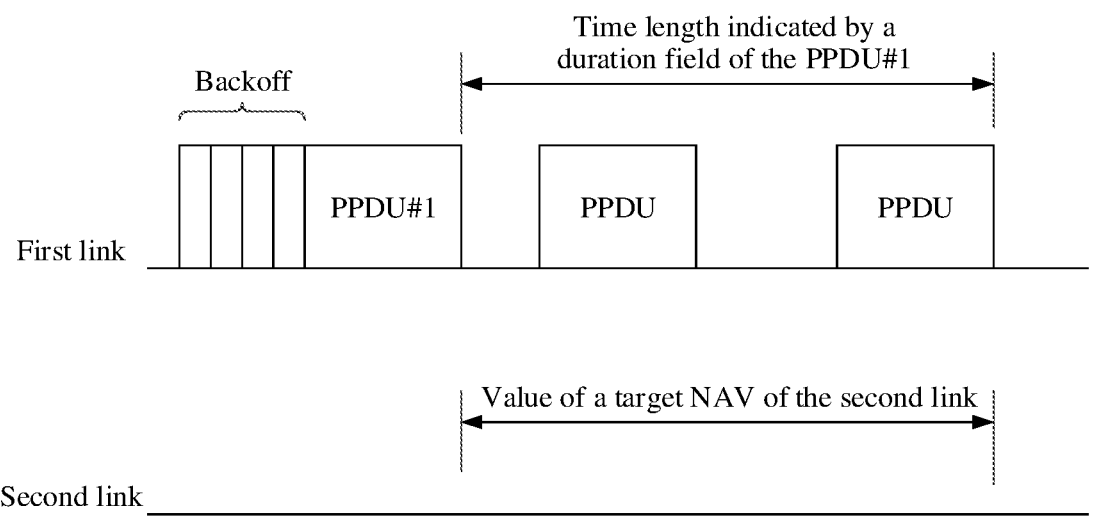
FIG. 7 is a schematic diagram of another ML communication scenario according to an embodiment of this application.

Refer to FIG. 7. An example is used for description. An ML non-AP entity 1 senses a PPDU #1 on a first link, and the PPDU #1 is sent by an ML AP to an ML non-AP entity 2. A station of the ML non-AP entity 1 on the first link, a station of the ML non-AP entity 2 on the first link, and a station of the ML AP entity on the first link belong to a same BSS. In this case, the ML non-AP entity 1 sets a target NAV of a second link to a value of a duration field of the PPDU #1. Therefore, before a value of the target NAV of the ML non-AP entity 1 reaches 0, the ML non-AP entity 1 does not send a PPDU to the ML AP entity on the second link. Therefore, when the ML AP entity sends the PPDU #1 to the ML non-AP entity 2 on the first link, the ML AP entity does not need to receive a PPDU #2 on the second link. This ensures normal communication of the ML AP entity. It should be noted that the target NAV of the second link does not need to be set to the value of the duration field of the PPDU #1 after transmission of the PPDU #1 ends. If the value of the duration field may be obtained in a transmission process of the PPDU #1, the target NAV of the second link may be set immediately after the value of the duration field is obtained. For example, when the PPDU #1 carries an A-MPDU, the value of the duration field may be obtained after a first MPDU is received. For another example, a SIG field of the PPDU #1 carries a TXOP duration field. After the SIG field is received, the value of the duration field may be obtained by using the TXOP duration field.

Figure 8:
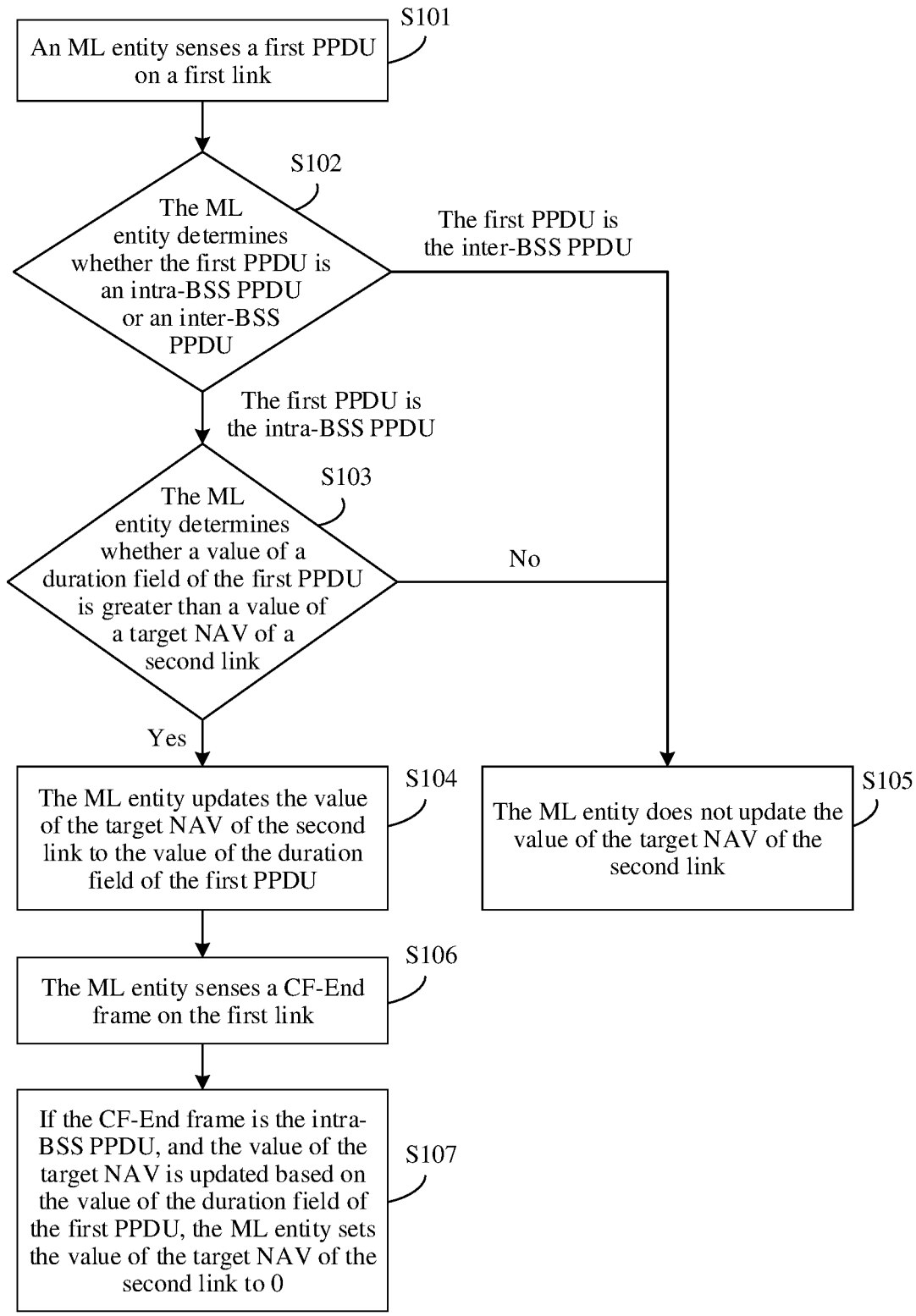
FIG. 8 is a flowchart of another communication protection method according to an embodiment of this application.

In an optional embodiment, according to the technical solution shown in FIG. 6, after step S104 shown in FIG. 8, the communication protection method further includes steps S106 and S107.

S106: The ML entity senses a CF-End frame on the first link.

The CF-End frame is used to indicate an end of a contention-free period. When the contention-free period ends, stations in a same BSS may initiate channel contention to access a channel.

In an implementation, a station of the ML entity on the first link senses the CF-End frame on the first link.

After sensing the CF-End frame, the station of the ML entity on the first link determines whether the CF-End frame is the intra-BSS PPDU. If the CF-End frame is the intra-BSS PPDU, an intra-BSS station does not occupy the channel on the first link. Therefore, the station of the ML entity on the first link may access the channel on the first link.

It may be understood that the CF-End frame is the intra-BSS PPDU. This indicates that the CF-End frame belongs to a BSS associated with the station of the ML entity on the first link.

For example, that the station of the ML entity on the first link determines whether the CF-End frame is the intra-BSS PPDU includes: If a BSS ID carried in the CF-End frame is the same as a BSS ID of the BSS associated with the station of the ML entity on the first link, the station of the ML entity on the first link may determine that the CF-End frame is the intra-BSS PPDU. Otherwise, the station of the ML entity on the first link may determine that the CF-End frame is not the intra-BSS PPDU. It should be understood that there is another implementation for determining whether the CF-End frame is the intra-BSS PPDU. This is not limited in this embodiment of this application.

S107: If the CF-End frame is the intra-BSS PPDU, and the value of the target NAV is updated based on the value of the duration field of the first PPDU, the ML entity sets the value of the target NAV of the second link to 0.

In an implementation, when the CF-End frame is the intra-BSS PPDU, the station of the ML entity on the second link sets the value of the target NAV of the second link to 0.

According to the technical solution shown in FIG. 8, the target NAV of the second link of the ML entity is updated based on the value of the duration field of the first PPDU sensed on the first link, to ensure that the ML entity does not send data on the second link. In this way, communication, on the first link, of the another ML entity in the same BSS is not affected. In this case, if the ML entity senses the CF-End frame in the same BSS on the first link, it indicates that the communication, on the first link, of the another ML entity in the same BSS has ended. Therefore, the ML entity may set the value of the target NAV to 0. This does not affect virtual carrier sensing of the ML entity on the second link by the communication on the first link, avoids delaying channel contention of the ML entity on the second link, and improves utilization of the second link by the ML entity.

Figure 9:
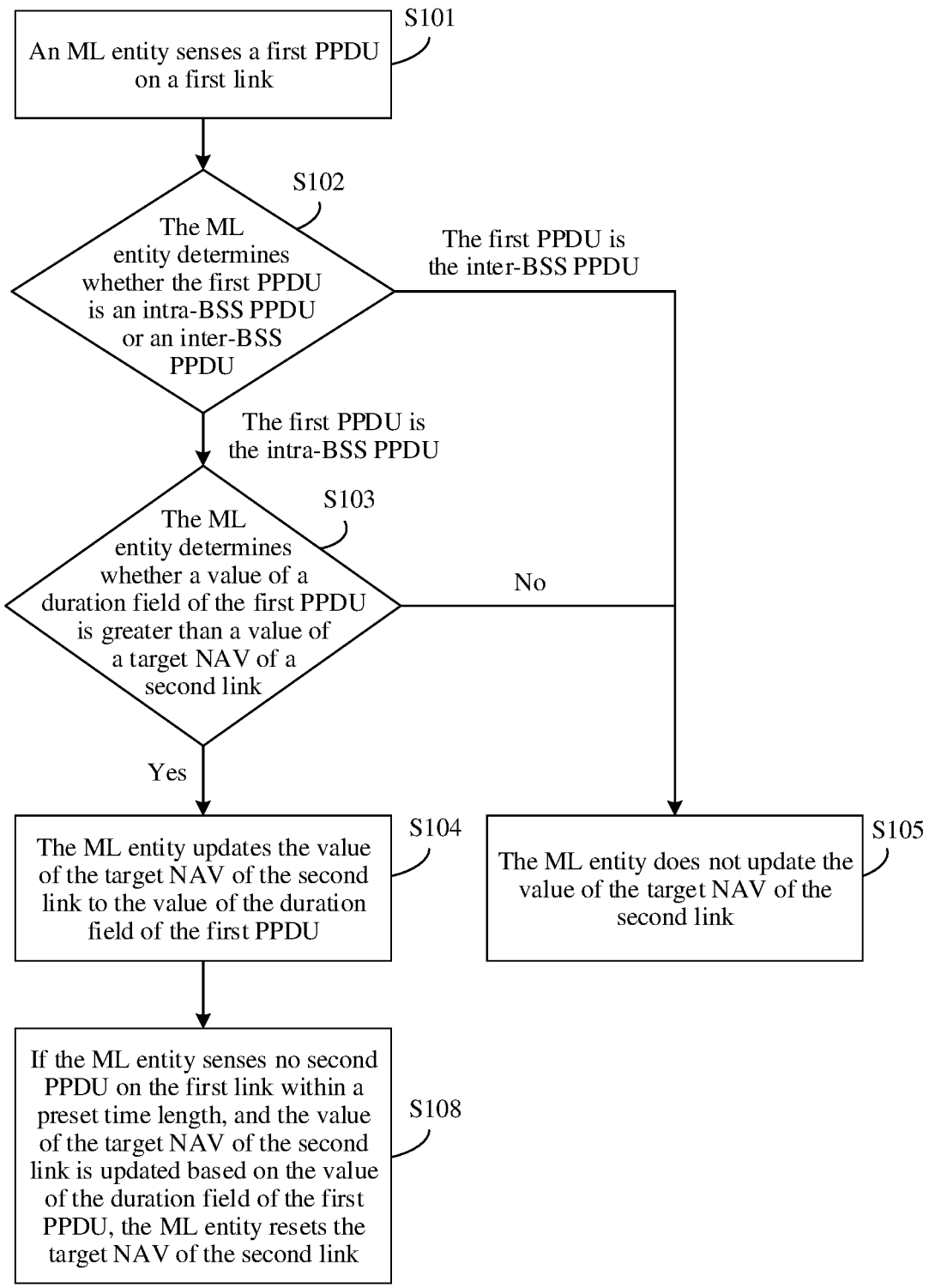
FIG. 9 is a flowchart of another communication protection method according to an embodiment of this application.

In an optional embodiment, according to the technical solution shown in FIG. 6, after step S104 shown in FIG. 9, the communication protection method further includes step S108.

S108: If the ML entity senses no second PPDU on the first link within a preset time length, and the value of the target NAV of the second link is updated based on the value of the duration field of the first PPDU, the ML entity resets the target NAV of the second link.

The second PPDU and the first PPDU are from a same station.

In a specific implementation, if the ML entity senses no PPDU on the first link within the preset time length, the ML entity determines that the second PPDU is not sensed on the first link within the preset time length. If the ML entity senses one or more PPDUs on the first link within the preset time length, and if transmit stations of the one or more PPDUs are different from a transmit station of the first PPDU, the ML entity determines that the first PPDU and the one or more PPDUs come from different stations. Further, the ML entity determines that the second PPDU is not sensed on the first link within the preset time length.

Optionally, the preset time length=(2*aSIFSTime)+(a transmission time length of a first PPDU response frame)+aRxPHYStartDelay+(2*aSlotTime).

aSIFSTime represents a time length of SIFS.

aSlotTime represents a time length of one slot. aSlotTime is usually 9 microseconds.

It should be understood that, when the first PPDU carries an RTS frame, the first PPDU response frame may be a CTS frame. In this case, the transmission time length of the first PPDU response frame is a time length of the CTS frame, and is usually denoted as CTS_Time. It should be noted that the transmission time length of the CTS frame may be determined based on a length of the CTS frame and a data transmission rate of the recently received RTS frame used to update the NAV.

aRxPHYStartDelay represents a time length of a preset delay. The preset delay is a delay between a start of receiving the PPDU by a receive antenna and issuance of primitive PHY-RXSTART.indication.

It should be noted that aRxPHYStartDelay corresponds to different values in different standards. For example, aRxPHYStartDelay is 20 microseconds in the IEEE 802.11a standard. aRxPHYStartDelay is 28 microseconds in the IEEE 802.11n standard. aRxPHYStartDelay is 40 microseconds in the IEEE 802.11ax standard.

In this embodiment of this application, the ML entity may reset the target NAV of the second link in any one of the following implementations.

Implementation 1: The ML entity sets the value of the target NAV of the second link to 0.

Implementation 2: The ML entity sets the value of the target NAV of the second link to a first value. An end moment determined by the first value is the same as an end moment determined by a second value, and the second value is a value of the target NAV before the target NAV is updated based on the value of the duration field of the first PPDU.

For example, at a moment T1, it is assumed that the value of the duration field of the first PPDU is L1, the current value of the target NAV of the second link is L2, and L1 is greater than L2. Therefore, the ML entity updates the value of the target NAV of the second link to L1. In this case, the second value of the target NAV is L2, and the end moment determined by the second value is a T1+L2 moment. After L3 time elapses, at a T1+L3 moment, if the ML entity sets the value of the target NAV of the second link to the first value, because the end moment of the first value is also the T1+L2 moment, the first value is L2−L3.

According to the technical solution shown in FIG. 9, if the ML entity senses, on the first link within the preset time length, no second PPDU sent by the transmit end of the first PPDU, it indicates that the transmit end of the first PPDU may not occupy the channel on the first link. Therefore, the ML entity may initiate channel contention on the first link, to send the first PPDU on the first link. In this case, if the target NAV is updated based on the value of the duration field of the first PPDU, the ML entity resets the target NAV. This does not affect the virtual carrier sensing of the ML entity on the second link by the communication on the first link, avoids delaying the channel contention of the ML entity on the second link, and improves the utilization of the second link by the ML entity.

Figures 10, 11:
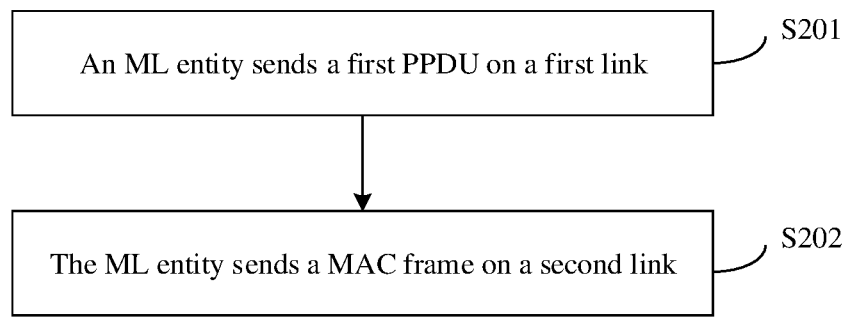
FIG. 10 is a flowchart of another communication protection method according to an embodiment of this application.
FIG. 11 is a schematic diagram of a frame structure of a notification frame according to an embodiment of this application.

FIG. 10 shows a communication protection method according to an embodiment of this application. The method includes the following steps.

S201: An ML entity sends a first PPDU on a first link.

The ML entity may support a plurality of links. The first link may be any one of the plurality of links supported by the ML entity.

It should be noted that the first PPDU includes a duration field. The duration field of the first PPDU is used to indicate a time length of a first time period. The first time period is a time period in which the ML entity occupies a channel on the first link. A start moment of the first time period is a transmission end moment of the PPDU.

In an implementation, a station of the ML entity on the first link sends the first PPDU on the first link.

S202: The ML entity sends a MAC frame on a second link.

The second link is another link in the plurality of links supported by the ML entity other than the first link. In other words, the first link and the second link are two different links.

The MAC frame is used to indicate a time length of a second time period. An intra-BSS station on the second link is prohibited from sending a second PPDU in the second time period. The second PPDU is different from the first PPDU. A start moment of the second time period is a transmission end moment of the MAC frame. An end moment of the second time period is the same as an end moment of the first time period.

In addition, both a transmission start moment and the transmission end moment of the MAC frame are before the transmission end moment of the first PPDU, to ensure that the intra-BSS station on the second link can receive the MAC frame before transmission of the PPDU is completed. In this way, the intra-BSS station on the second link does not send the second PPDU in the first time period.

In an implementation, when the station of the ML entity on the second link learns that the station of the ML entity on the first link sends the first PPDU on the first link, the station of the ML entity on the second link sends the MAC frame on the second link.

In this embodiment of this application, the MAC frame may be a notification frame or a QTP frame. It should be noted that the notification frame is a new type of control frame defined in this embodiment of this application.

The MAC frame is the notification frame, and the notification frame has the following two implementations.

Implementation 1: The notification frame includes a duration field and a time length field.

The time length field of the notification frame is used to set a value of an NAV maintained by the intra-BSS station on the second link. The time length field of the notification frame is not used to set a value of an NAV maintained by an OBSS station on the second link.

In other words, the intra-BSS station on the second link reads the time length field included in the notification frame, and sets the value of the NAV maintained by the intra-BSS station to a value of the time length field included in the notification frame. However, the OBSS station on the second link does not set the value of the NAV maintained by the OBSS station to the value of the time length field of the notification frame.

It should be noted that, that the station sets the value of the NAV maintained by the station to the value of the time length field included in the notification frame specifically means that when the value of the time length field included in the notification frame is greater than the value of the NAV maintained by the station, the station updates the value of the NAV to the value of the time length field. Otherwise, the station does not update the NAV value.

The intra-BSS station on the second link is a station that belongs to a same BSS as the station of the ML entity on the second link. The OBSS station on the second link is a station that does not belong to the same BSS as the station of the ML entity on the second link.

In this embodiment of this application, the value of the time length field of the notification frame is equal to the time length of the second time period, so that the intra-BSS station on the second link cannot access a channel in at least the second time period. This avoids interference caused by the intra-BSS station on the second link to communication of the ML entity.

For example, FIG. 11 is a schematic diagram of a notification frame according to an embodiment of this application. The notification frame includes at least the following fields: a frame control field, a duration field, a receiving address (RA) field, a transmitting address (TA) field, an ML transmission time length (ML trans time) field, and a frame check sequence (FCS) field.

The ML transmission time length field of the notification frame shown in FIG. 11 is the time length field of the notification frame mentioned above. In other words, the ML transmission time length field of the notification frame shown in FIG. 11 is used to set a value of an NAV maintained by an intra-BSS station on a second link.

The frame control field further includes the following fields: a protocol version field, a type field, and a subtype field.

Optionally, in this embodiment of this application, when a type field and a subtype field of a control frame are set to preset values, the control frame is the notification frame provided in this embodiment of this application.

For example, Table 1 shows meanings of the type field and the subtype field with different values. Refer to Table 1. If a value of a type field of a control frame is 01 and a value of a subtype field is 0001, the control frame is the notification frame.

TABLE 1

| Value of the type field | Type description | Value of the subtype field | Subtype description |
|---|---|---|---|
| 01 | Control (control) | 0000 | Reserved |
| 01 | Control | 0001 | ML notification |
| 01 | Control | 0010 | Triggering (trigger) |
| . . . | . . . | . . . | . . . |

Figure 12:
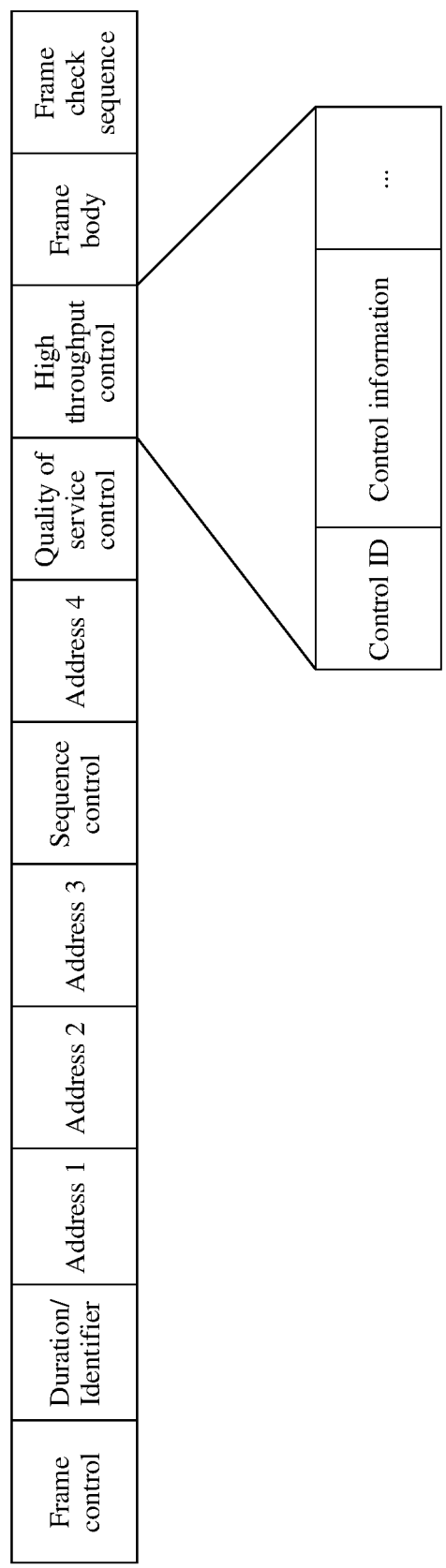
FIG. 12 is a schematic diagram of a frame structure of a notification frame according to an embodiment of this application.

For example, FIG. 12 is a schematic diagram of a notification frame according to an embodiment of this application. The notification frame is a frame that includes a new type of high throughput (HT) control field defined in this application. As shown in FIG. 11, the notification frame includes one of the following fields: a frame control field, a duration/identifier field, an address 1 field, an address 2 field, an address 3 field, a sequence control field, an address 4 field, a quality of service (QoS) control field, an HT control field, a frame body field, and an FCS field.

The duration/identifier field of the notification frame shown in FIG. 12 is equivalent to the duration field of the notification frame mentioned above.

The HT control field includes one of the following fields: a control ID field and a control information field. A value of the control ID field is a preset value, to indicate that an HT control frame is the notification frame. The control information field of the notification frame shown in FIG. 12 is equivalent to the time length field of the notification frame mentioned above. In other words, the control information field of the notification frame shown in FIG. 12 is used to indicate a time length of a second time period. Optionally, the control information field may be 16 bits.

Figure 13:
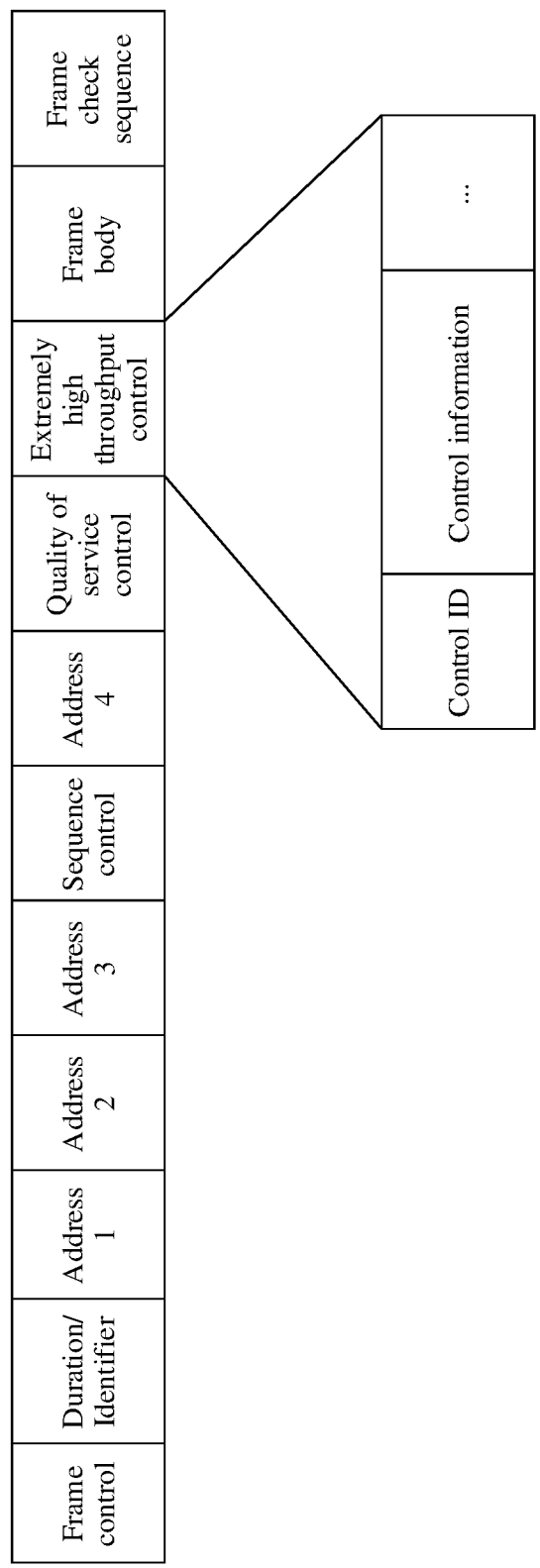
FIG. 13 is a schematic diagram of a frame structure of a notification frame according to an embodiment of this application.

For example, FIG. 13 is a schematic diagram of a notification frame according to an embodiment of this application. The notification frame is a frame that includes a new type of extremely high throughput (EHT) control field defined in this application. As shown in FIG. 13, the notification frame includes one of the following fields: a frame control field, a duration/identifier field, an address 1 field, an address 2 field, an address 3 field, a sequence control field, an address 4 field, a quality of service control field, an EHT control field, a frame body field, and an FCS field.

The duration/identifier field of the notification frame shown in FIG. 13 is equivalent to the duration field of the notification frame mentioned above.

The EHT control field includes one of the following fields: a control ID field and a control information field.

A value of the control ID field is a preset value, to indicate that an EHT control frame is the notification frame. For example, the preset value may be 7.

The control information field of the notification frame shown in FIG. 13 is equivalent to the time length field of the notification frame mentioned above. In other words, the control information field of the notification frame shown in FIG. 13 is used to indicate a time length of a second time period. Optionally, the control information field may be 16 bits.

Implementation 2: The notification frame includes a duration field. The duration field is used to enable the intra-BSS station on the second link to set an NAV. In other words, the intra-BSS station on the second link reads the time length field included in the notification frame, and sets the value of the NAV maintained by the intra-BSS station to a value of the time length field included in the notification frame. However, the OBSS station on the second link does not set the value of the NAV maintained by the OBSS station to the value of the time length field included in the notification frame.

In this embodiment of this application, the value of the duration field included in the notification frame is equal to the time length of the second time period, to ensure normal communication of the ML entity.

According to the technical solution shown in FIG. 10, when the ML entity sends a PPDU on the first link, the ML entity sends the MAC frame on the second link, so that another station in a same BSS on the second link does not send the PPDU before the end moment of the first time period. In this way, it is ensured that the ML entity does not send the PPDU on the first link and receives a PPDU on the second link. This ensures the normal communication of the ML entity.

Figure 14:
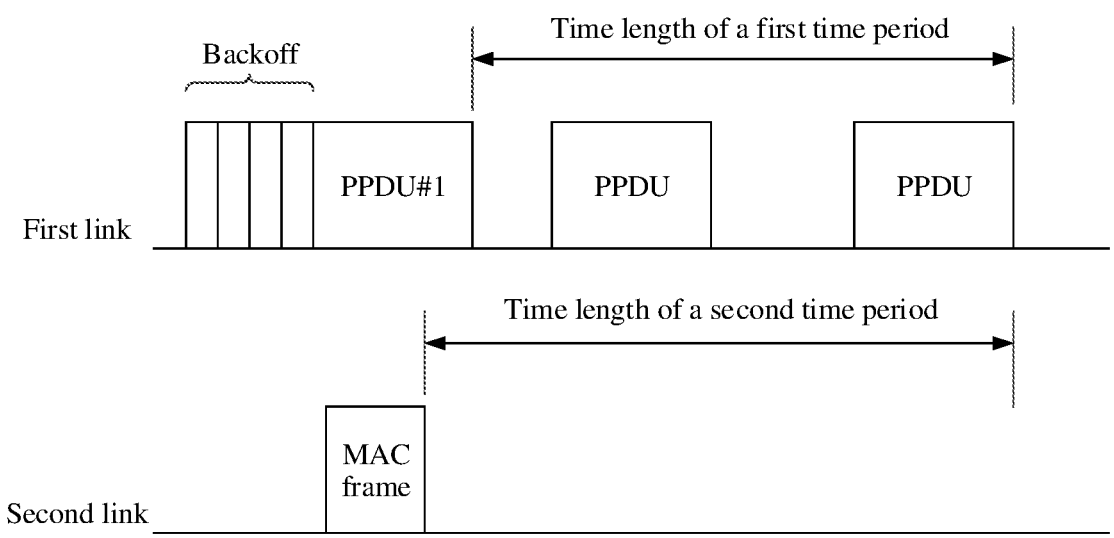
FIG. 14 is a schematic diagram of another ML communication scenario according to an embodiment of this application.

Refer to FIG. 14. An example is used for description. An ML AP entity sends a PPDU to an ML non-AP entity 1 on a first link, and the ML AP entity simultaneously sends a MAC frame on a second link, so that a non-AP STA in a same BSS on the second link does not send the PPDU to the ML AP entity. Therefore, the ML AP entity does not send the PPDU on the first link and receives a PPDU on the second link. This ensures normal communication of the ML AP entity.

Figure 15:
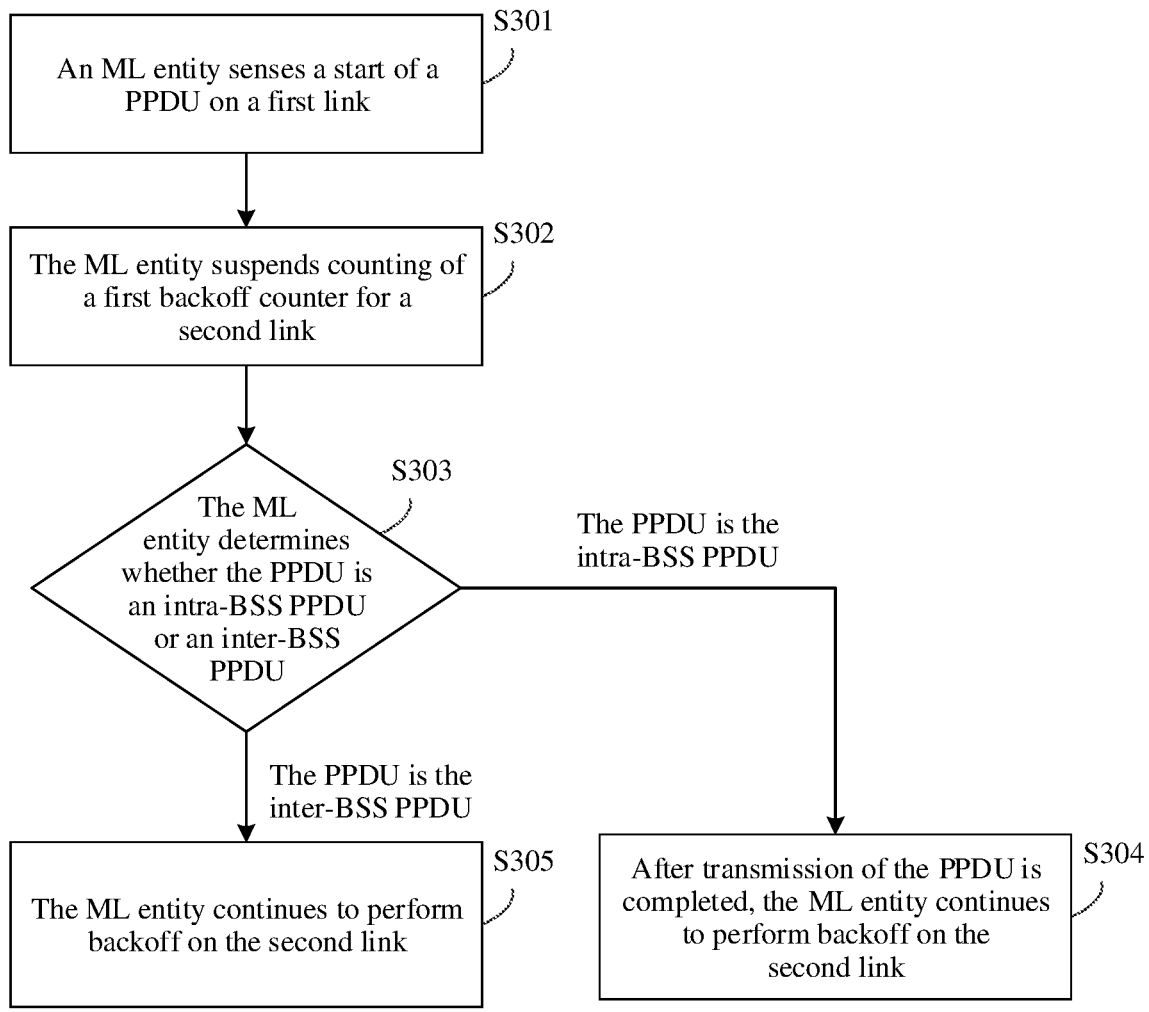
FIG. 15 is a flowchart of another communication protection method according to an embodiment of this application.

FIG. 15 shows a communication protection method according to an embodiment of this application. The method includes the following steps.

S301: An ML entity senses a start of a PPDU on a first link.

The ML entity may support a plurality of links. The first link may be any one of the plurality of links supported by the ML entity.

Optionally, the start of the PPDU may be an L-STF of the PPDU. The L-STF is used to enable stations to synchronously receive the PPDU.

In an implementation, a station of the ML entity on the first link senses the start of the PPDU on the first link.

S302: The ML entity suspends counting of a first backoff counter for a second link.

The second link is another link in the plurality of links supported by the ML entity other than the first link. In other words, the first link and the second link are two different links.

In an implementation, when a station of the ML entity on the second link learns that the station of the ML entity on the first link senses the start of the PPDU, the station of the ML entity on the second link suspends counting of the first backoff counter. Therefore, a backoff procedure of the ML entity on the second link is suspended.

It may be understood that after the first backoff counter suspends counting, a count value of the first backoff counter remains a current value.

S303: The ML entity determines whether the PPDU is an intra-BSS PPDU or an inter-BSS PPDU.

In an implementation, the station of the ML entity on the first link determines whether the PPDU is the intra-BSS PPDU or the inter-BSS PPDU. For a method for determining whether the PPDU is the intra-BSS PPDU or the inter-BSS PPDU, refer to the conventional technology. Details are not described herein.

When the PPDU is the intra-BSS PPDU, the ML entity performs the following step S304.

When the PPDU is the inter-BSS PPDU, the ML entity performs the following step S305.

S304: When the PPDU is the intra-BSS PPDU, the ML entity continues to perform backoff on the second link after transmission of the PPDU is completed.

In an implementation, if the PPDU is the intra-BSS PPDU, after the transmission of the PPDU is completed, the station of the ML entity on the second link resumes a counting function of the first backoff counter. In this way, the station of the ML entity on the second link may continue to perform the backoff procedure.

In this embodiment of this application, that the ML entity continues to perform backoff after the transmission of the PPDU is completed includes one of the following cases.

Case 1: The ML entity continues to perform backoff after a first moment. The first moment is a transmission end moment of the PPDU.

In an implementation, after the first moment, the ML entity waits for idle time of the second link to reach second interframe space. After the idle time of the second link reaches the second interframe space, each time the second link is in an idle state in one slot, the count value of the first backoff counter for the second link is subtracted by 1 until the count value of the first backoff counter for the second link is 0.

Figure 16A:
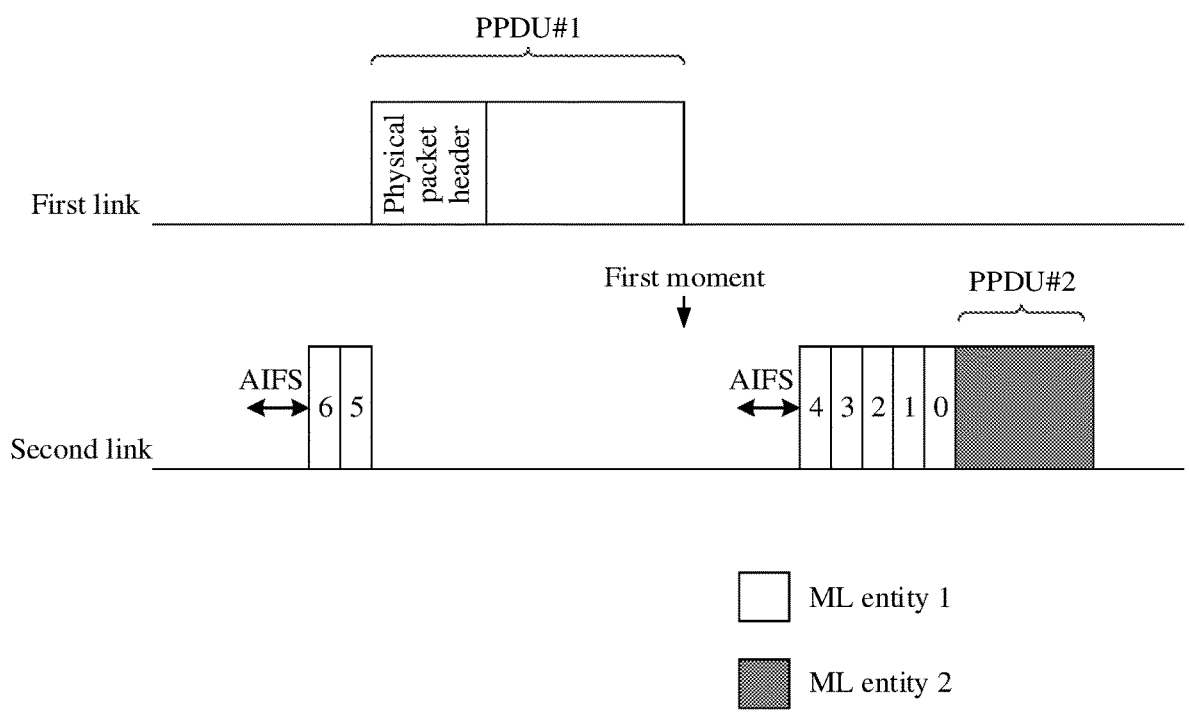
FIG. 16(a) is a schematic diagram of another ML communication scenario according to an embodiment of this application.

Refer to FIG. 16(a). An example is used for description. An ML entity 1 sends a PPDU #1 on the first link. When an ML entity 2 senses a start of the PPDU #1 on the first link, the ML entity 2 suspends counting of the first backoff counter for the second link. In this case, the count value of the first backoff counter is 5. Then, after sensing a physical packet header of the PPDU #1 on the second link, the ML entity 2 determines, based on information in the physical packet header, that the PPDU #1 is the intra-BSS PPDU. In this way, at a transmission end moment of the PPDU #1, the ML entity 2 resumes the counting function of the first backoff counter for the second link, and continues to perform backoff. Specifically, the ML entity 2 waits for the idle time of the second link to reach the second interframe space. After the idle time of the second link reaches the second interframe space, the first backoff counter for the second link performs backoff from 5. When the count value of the backoff counter decreases to 0, the ML entity 2 sends a PPDU #2 on the second link.

Case 2: The ML entity continues to perform backoff after a second moment. The second moment is a transmission end moment of a response frame corresponding to the PPDU.

In an implementation, after the first moment, the ML entity waits for idle time of the second link to reach second interframe space. After the idle time of the second link reaches the second interframe space, each time the second link is in an idle state in one slot, the count value of the first backoff counter for the second link is subtracted by 1 until the count value of the first backoff counter for the second link is 0.

Optionally, the second moment may be determined based on a transmission end moment of the PPDU, first interframe space, and a maximum transmission time length of a BA frame. For example, the first interframe space may be SIFS. This is not limited in this embodiment of this application.

Figure 16B:
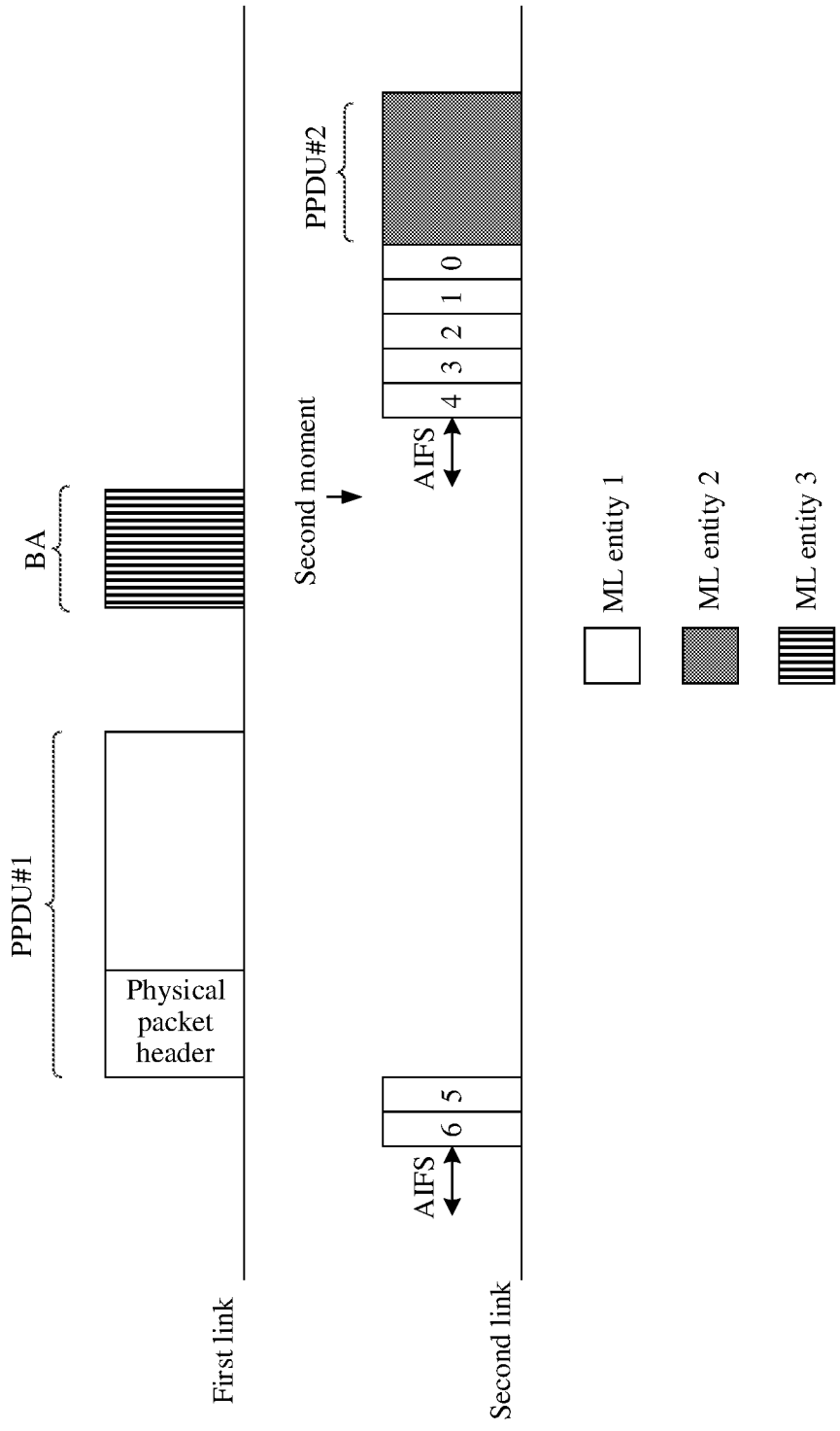
FIG. 16(b) is a schematic diagram of another ML communication scenario according to an embodiment of this application.
Figure 16C:
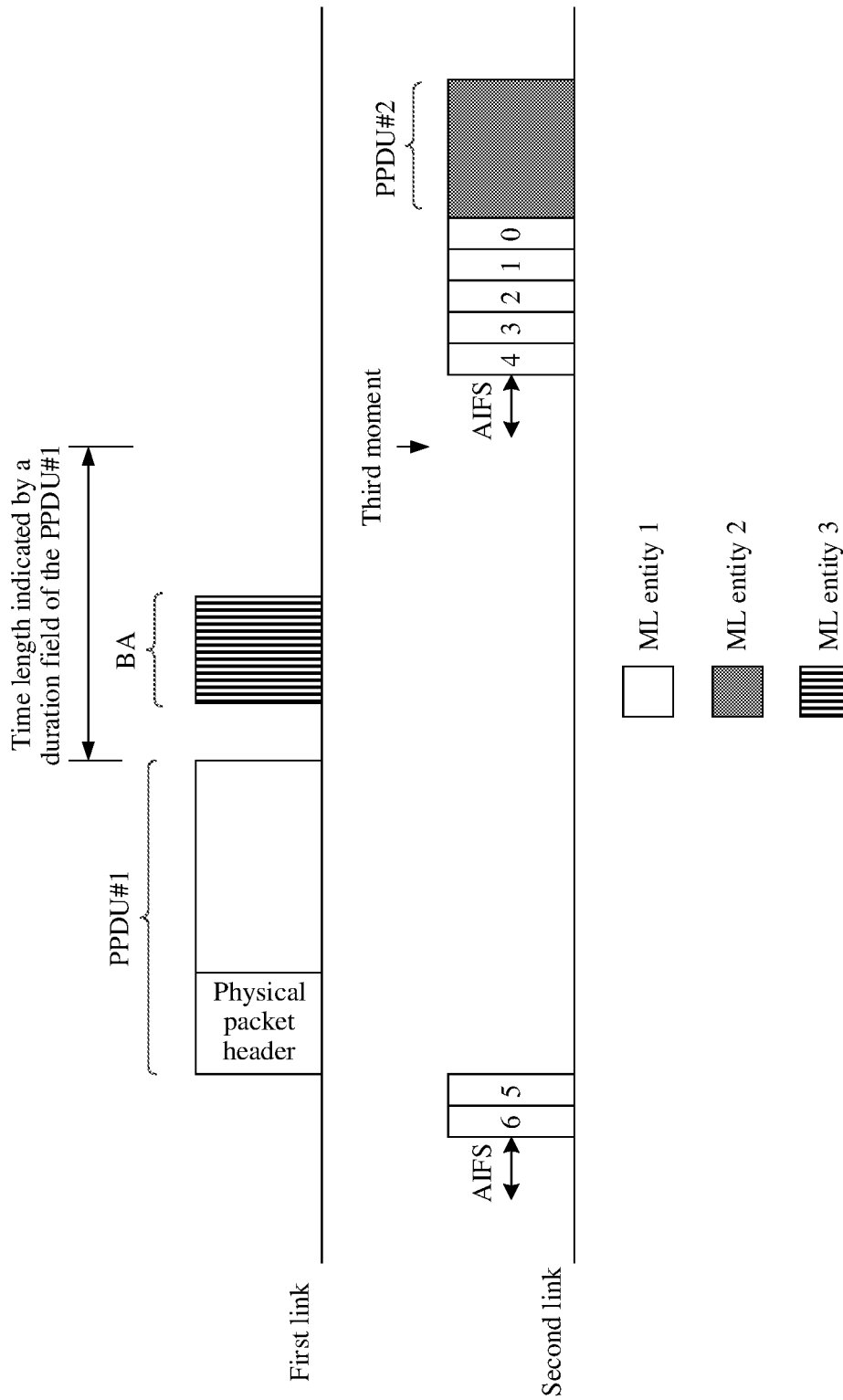
FIG. 16(c) is a schematic diagram of another ML communication scenario according to an embodiment of this application.
Figure 16D:
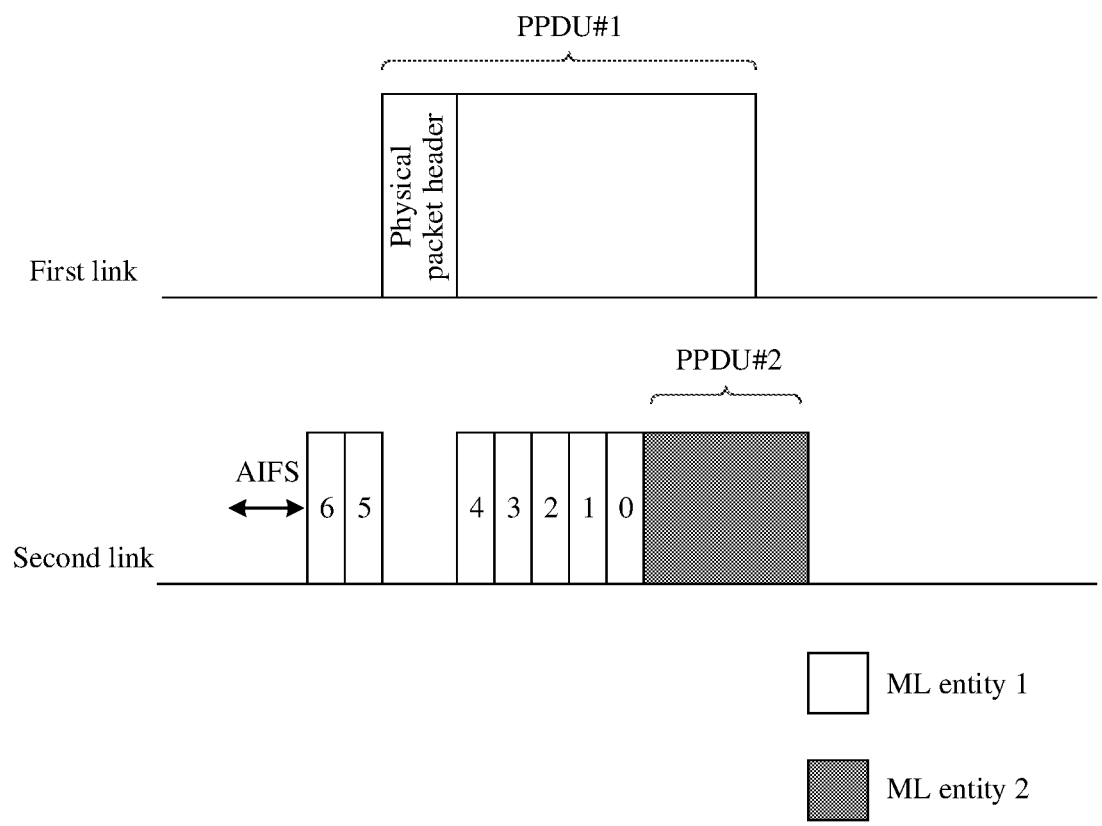
FIG. 16(d) is a schematic diagram of another ML communication scenario according to an embodiment of this application.

Refer to FIG. 16(b). An example is used for description. An ML entity 1 sends a PPDU #1 on the first link. When an ML entity 2 senses a start of the PPDU #1 on the first link, the ML entity 2 suspends counting of the first backoff counter for the second link. In this case, the count value of the first backoff counter is 5. Then, after sensing a physical packet header of the PPDU #1 on the second link, the ML entity 2 determines, based on information in the physical packet header, that the PPDU #1 is the intra-BSS PPDU. In this way, after transmission of the PPDU #1 is completed, the ML entity 2 determines the second moment based on a transmission end moment of the PPDU #1, the first interframe space, and a maximum transmission time length of the response frame. When the time reaches the second moment, the ML entity 2 resumes the counting function of the first backoff counter for the second link, and continues to perform backoff. Specifically, the ML entity 2 waits for the idle time of the second link to reach the second interframe space. After the idle time of the second link reaches the second interframe space, the first backoff counter for the second link performs backoff from 5. When the count value of the first backoff counter decreases to 0, the ML entity 2 sends a PPDU #2 on the second link.

Case 3: The ML entity continues to perform backoff after a third moment. The third moment is an end moment determined by a duration field of the PPDU. Specifically, a time interval between the third moment and a transmission end moment of the PPDU is equal to a value of a duration field of the PPDU.

In an implementation, after a first moment, the ML entity waits for idle time of the second link to reach second interframe space. After the idle time of the second link reaches the second interframe space, each time the second link is in an idle state in one slot, the count value of the first backoff counter for the second link is subtracted by 1 until the count value of the first backoff counter for the second link is 0.

Refer to FIG. 16(*c*). An example is used for description. An ML entity 1 sends a PPDU #1 on the first link. When an ML entity 2 senses a start of the PPDU #1 on the first link, the ML entity 2 suspends counting of the first backoff counter for the second link. In this case, the count value of the first backoff counter is 5. Then, after sensing a physical packet header of the PPDU #1 on the second link, the ML entity 2 determines, based on information in the physical packet header, that the PPDU #1 is the intra-BSS PPDU. In this way, after transmission of the PPDU #1 is completed, the ML entity 2 determines the third moment based on a transmission end moment of the PPDU #1 and a value of a duration field of the PPDU #1. When the time reaches the third moment, the ML entity 2 resumes the counting function of the first backoff counter for the second link, and continues to perform backoff. Specifically, the ML entity 2 waits for the idle time of the second link to reach the second interframe space. After the idle time of the second link reaches the second interframe space, the first backoff counter for the second link performs backoff from 5. When the count value of the first backoff counter decreases to 0, the ML entity 2 sends a PPDU #2 on the second link.

S305: When the PPDU is the inter-BSS PPDU, the ML entity continues to perform backoff on the second link.

In an implementation, if the PPDU is the inter-BSS PPDU, the station of the ML entity on the second link resumes the counting function of the first backoff counter. In this way, the station of the ML entity on the second link may continue to perform the backoff procedure.

Optionally, after a fourth moment, each time the second link is in an idle state in one slot, the count value of the first backoff counter for the second link is subtracted by 1 until the count value of the first backoff counter for the second link is 0.

Alternatively, after the fourth moment, the ML entity waits for idle time of the second link to reach second interframe space. After the idle time of the second link reaches the second interframe space, each time the second link is in the idle state in one slot, the count value of the first backoff counter for the second link is subtracted by 1 until the count value of the first backoff counter for the second link is 0.

The fourth moment is a moment at which the ML entity determines that the PPDU is the inter-BSS PPDU.

Refer to FIG. 16(*d*). An example is used for description. An ML entity 1 sends a PPDU #1 on the first link. When an ML entity 2 senses a start of the PPDU #1 on the first link, the ML entity 2 suspends counting of the first backoff counter for the second link. In this case, the count value of the first backoff counter is 5. Then, after sensing a physical packet header of the PPDU #1 on the second link, the ML entity 2 determines that the PPDU #1 is the inter-BSS PPDU. In this case, the ML entity 2 immediately resumes the counting function of the first backoff counter for the second link, and continues to perform backoff. After the backoff ends, the ML entity 2 sends a PPDU #2 on the second link.

According to the technical solution shown in FIG. 15, after the ML entity senses the start of the PPDU on the first link, the ML entity suspends counting of the first backoff counter for the second link. When the PPDU is the intra-BSS PPDU, the ML entity continues to perform backoff after the transmission of the PPDU is completed. In this way, in a PPDU transmission process on the first link, the ML entity does not send a PPDU on the second link. This avoids a case in which another ML entity in a same BSS receives a signal on the first link and sends a signal on another link. In addition, when the ML entity determines that the PPDU is the inter-BSS PPDU, the ML entity immediately continues to perform backoff, to ensure that the ML entity can normally access a channel on the second link.

Figure 17:
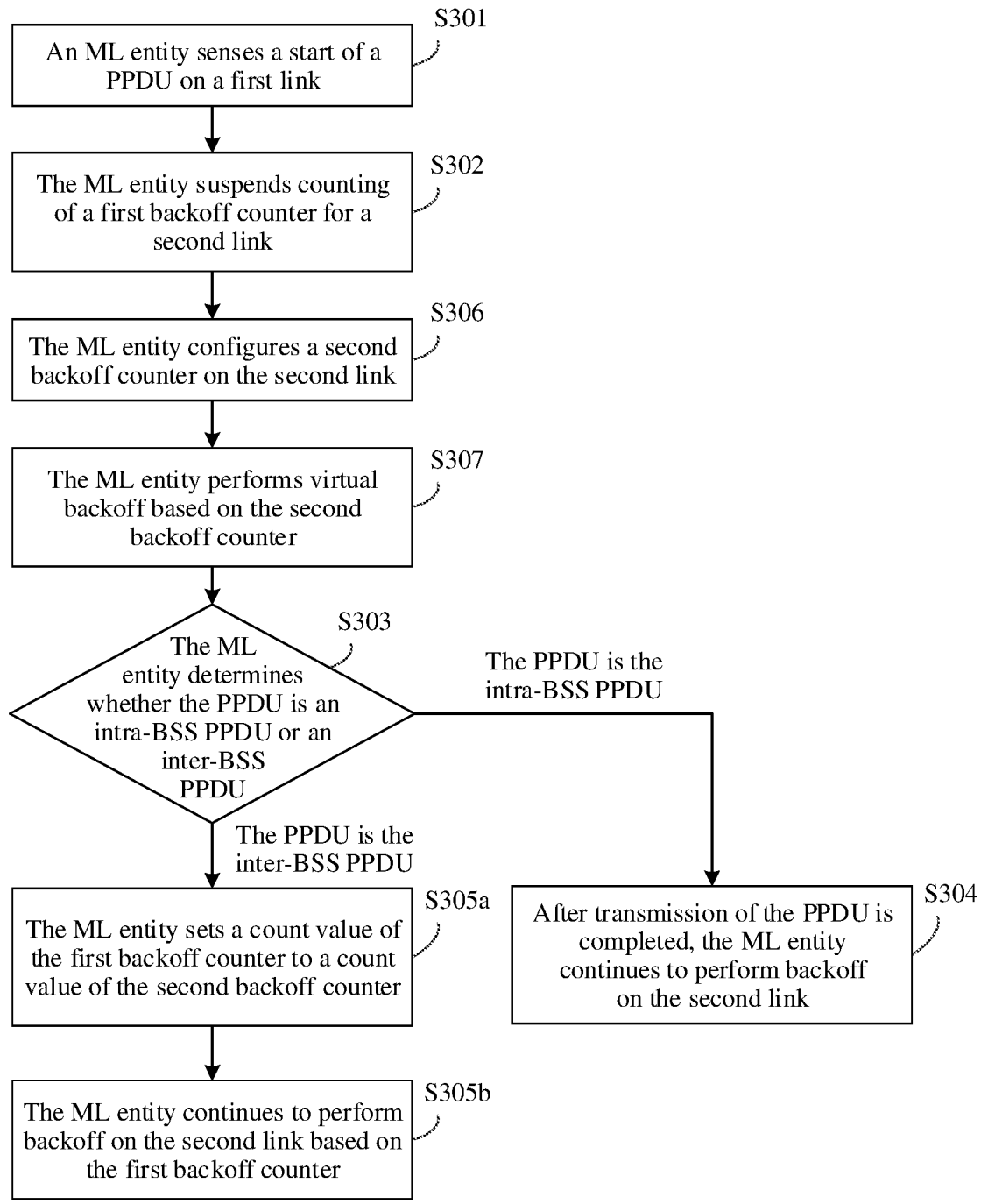
FIG. 17 is a flowchart of another communication protection method according to an embodiment of this application.

In an optional embodiment, according to the technical solution shown in FIG. 15, as shown in FIG. 17, after step S302, the communication protection method further includes steps S306 and S307. In addition, step S305 may be replaced with steps S305*a* and S305*b*.

S306: The ML entity configures a second backoff counter for the second link.

In an implementation, the station of the ML entity on the second link configures the second backoff counter. An initial value of the second backoff counter is the current value of the first backoff counter.

For example, it is assumed that when the ML entity freezes the first backoff counter, the current value of the first backoff counter is 15, and the initial value of the second backoff counter is also 15.

S307: The ML entity performs virtual backoff based on the second backoff counter.

The virtual backoff means that if the second link is in the idle state at a current moment, the ML entity subtracts a count value of the second backoff counter by 1 each time the second link is in the idle state in one slot; or if the second link is in a busy state at a current moment, the ML entity waits for the idle time of the second link to reach the second interframe space, and after the idle time of the second link reaches the second interframe space, the ML entity subtracts a count value of the second backoff counter by 1 each time the second link is in the idle state in one slot.

It should be understood that the current moment is a moment at which the ML entity completes configuration of the second backoff counter.

Optionally, the second interframe space may be AIFS or another interframe space. This is not limited in this embodiment of this application.

It may be understood that if the second link is in the busy state in a slot, the ML entity needs to wait again for the idle time of the second link to reach the second interframe space. After the idle time of the second link reaches the second interframe space, the ML entity resumes counting of the second backoff counter.

Optionally, the busy/idle state of the second link may be determined based on a busy/idle state of a primary channel of the second link. In other words, if the primary channel of the second link is in the busy state, it indicates that the second link is in the busy state. If the primary channel of the second link is in the idle state, it indicates that the second link is in the idle state. The primary channel of the second link may be preconfigured, or may be defined in a standard.

This is not limited in this embodiment of this application. For example, the primary channel of the second link may be a 20 MHz channel with a highest frequency in a frequency band corresponding to the second link. For another example, the primary channel of the second link may be a 20 MHz channel with a lowest frequency in a frequency band corresponding to the second link.

In this embodiment of this application, before the ML entity determines whether the PPDU is the intra-BSS PPDU or the inter-BSS PPDU, if the count value of the second backoff counter decreases to 0, the ML entity may maintain the second backoff counter in any one of the following manners.

Manner 1: The ML entity maintains the count value of the second backoff counter as 0.

In other words, the station of the ML entity on the second link maintains the count value of the second backoff counter as 0.

Manner 2: The ML entity resets the count value of the second backoff counter. It should be understood that after reconfiguring the count value of the second backoff counter, the ML entity continues to perform backoff based on the second backoff counter.

It should be noted that the ML entity resets the count value of the second backoff counter includes: The ML entity resets the count value of the second backoff counter based on a doubled contention window; the ML entity resets the count value of the second backoff counter based on a minimum value of a contention window; or the ML entity resets the count value of the second backoff counter based on a contention window.

The foregoing doubling specifically means that if the contention window CW does not reach CWmax, the CW is updated to 2×CW+1. If the contention window CW reaches CWmax, the CW remains unchanged.

It should be noted that steps S306 and S307, and step S303 are performed simultaneously.

S305a: When the PPDU is the inter-BSS PPDU, the ML entity sets the count value of the first backoff counter to the count value of the second backoff counter.

In an implementation, the station of the ML entity on the second link sets the count value of the first backoff counter to the count value of the second backoff counter.

For example, it is assumed that when the ML entity freezes the first backoff counter, the current value of the first backoff counter is 15. Then, when the ML entity determines that the PPDU is the inter-BSS PPDU, if the count value of the second backoff counter is 10, the count value of the first backoff counter is updated to 10.

S305b: The ML entity continues to perform backoff on the second link based on the first backoff counter.

In an implementation, the station of the ML entity on the second link resumes the counting function of the first backoff counter for the second link, and continues to perform backoff.

Optionally, after the fourth moment, each time the second link is in the idle state in one slot, the count value of the first backoff counter for the second link is subtracted by 1 until the count value of the first backoff counter for the second link is 0. The fourth moment is a moment at which the ML entity determines that the PPDU is the inter-BSS PPDU.

Optionally, regardless of whether the second link is always in the idle state in the second interframe space before the fourth moment, provided that the second link is in the idle state at the fourth moment, each time the second link is in the idle state in one slot, the count value of the first backoff counter for the second link is subtracted by 1 until the count value of the first backoff counter of the second link is 0.

Figure 16E:
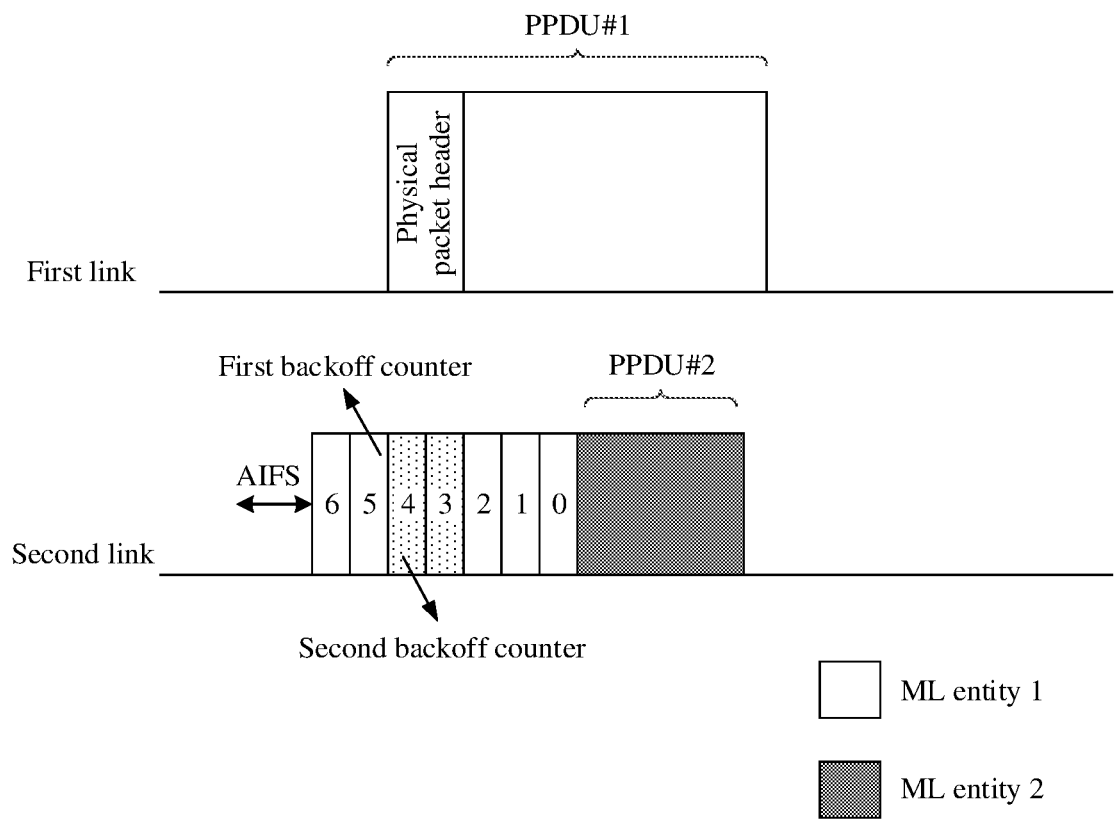
FIG. 16(e) is a schematic diagram of another ML communication scenario according to an embodiment of this application.

Refer to FIG. 16(e). An example is used to describe the technical solution shown in FIG. 17. As shown in FIG. 16(e), an ML entity 1 sends a PPDU #1 on the first link. When an ML entity 2 senses a start of the PPDU #1 on the first link, the ML entity 2 suspends counting of the first backoff counter for the second link. In this case, the count value of the first backoff counter is 5. In addition, the ML entity 2 configures the second backoff counter for the second link. The count value of the second backoff counter is 5.

In two slots in which the ML entity 2 senses a physical packet header of the PPDU #1 on the first link, the second link is in the idle state. Therefore, the count value of the second backoff counter decreases to 3. After sensing the physical packet header of the PPDU #1 on the second link, the ML entity 2 determines that the PPDU #1 is the inter-BSS PPDU. In this case, the ML entity 2 updates the count value of the first backoff counter to 3, and continues to perform backoff. After the count value of the first backoff counter decreases to 0, the ML entity 2 sends a PPDU #2 on the second link.

Figure 16F:
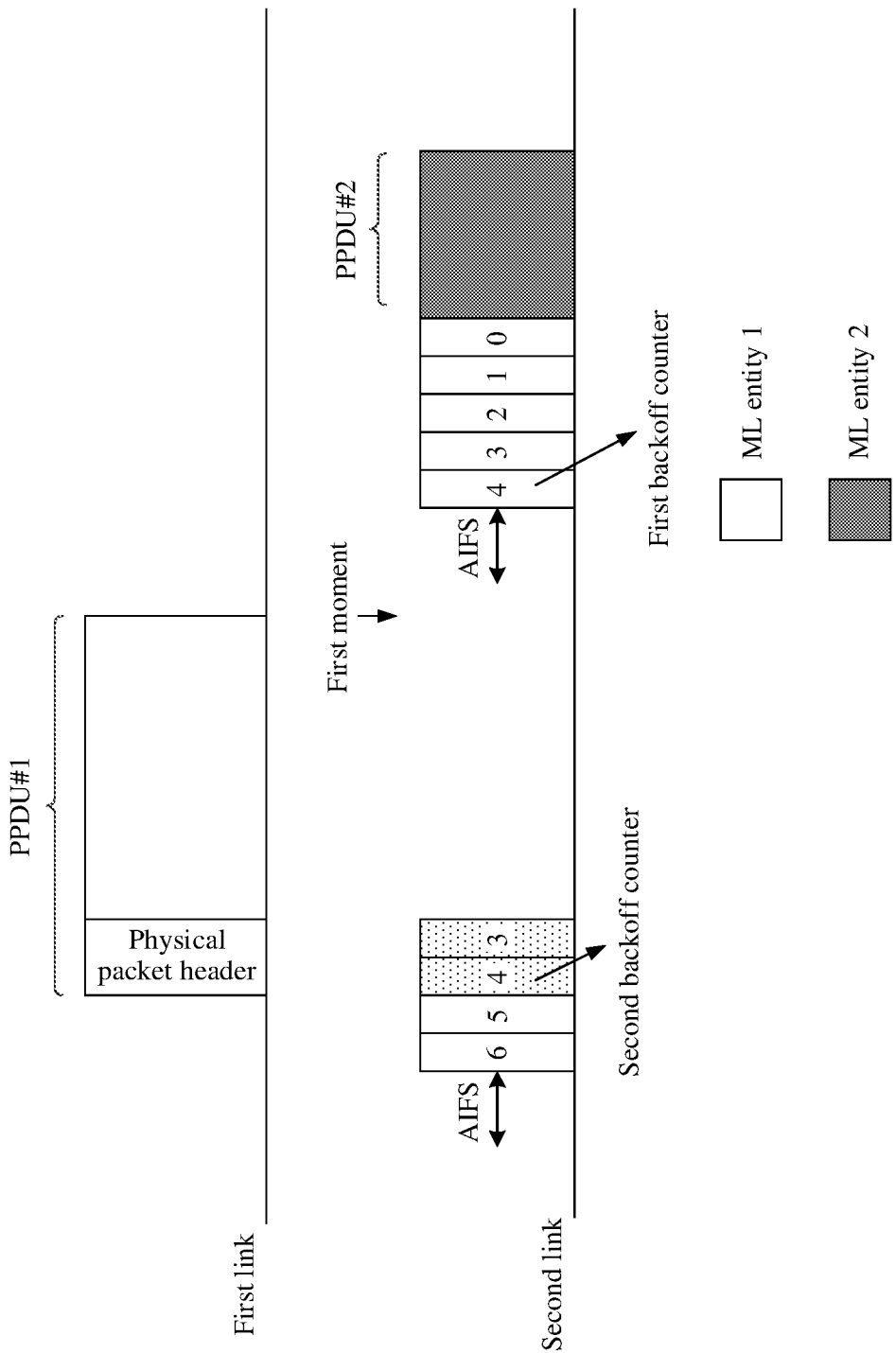
FIG. 16(f) is a schematic diagram of another ML communication scenario according to an embodiment of this application.

Refer to FIG. 16(f). An example is used to describe the technical solution shown in FIG. 17. As shown in FIG. 16(f), an ML entity 1 sends a PPDU #1 on the first link. When an ML entity 2 senses a start of the PPDU #1 on the first link, the ML entity 2 suspends counting of the first backoff counter for the second link. In this case, the count value of the first backoff counter is 5. In addition, the ML entity 2 configures the second backoff counter for the second link. The count value of the second backoff counter is 5. In two slots in which the ML entity 2 senses a physical packet header of the PPDU #1 on the first link, the second link is in the idle state. Therefore, the count value of the second backoff counter decreases to 3. After sensing the physical packet header of the PPDU #1 on the second link, the ML entity 2 determines that the PPDU #1 is the intra-BSS PPDU. In this case, the ML entity 2 does not update the count value of the first backoff counter, so that the ML entity 2 continues to perform backoff based on the first backoff counter whose count value is 5. After the count value of the first backoff counter decreases to 0, the ML entity 2 sends a PPDU #2 on the second link.

According to the technical solution shown in FIG. 17, after the ML entity senses the start of the PPDU on the first link, the ML entity suspends counting of the first backoff counter for the second link. In addition, the ML entity configures the second backoff counter. The initial value of the second backoff counter is the current value of the first backoff counter. In this way, the ML entity performs virtual backoff based on the second backoff counter. When the ML entity determines that the PPDU is the inter-BSS PPDU, the ML entity sets the count value of the first backoff counter to the count value of the second backoff counter, so that the first backoff counter is not affected by the previous suspension. In this way, when the PPDU is the inter-BSS PPDU, the backoff procedure of the ML entity on the second link is not affected. This avoids that the ML entity is at a disadvantage in channel contention, and ensures that the ML entity uses the second link.

Figure 18:
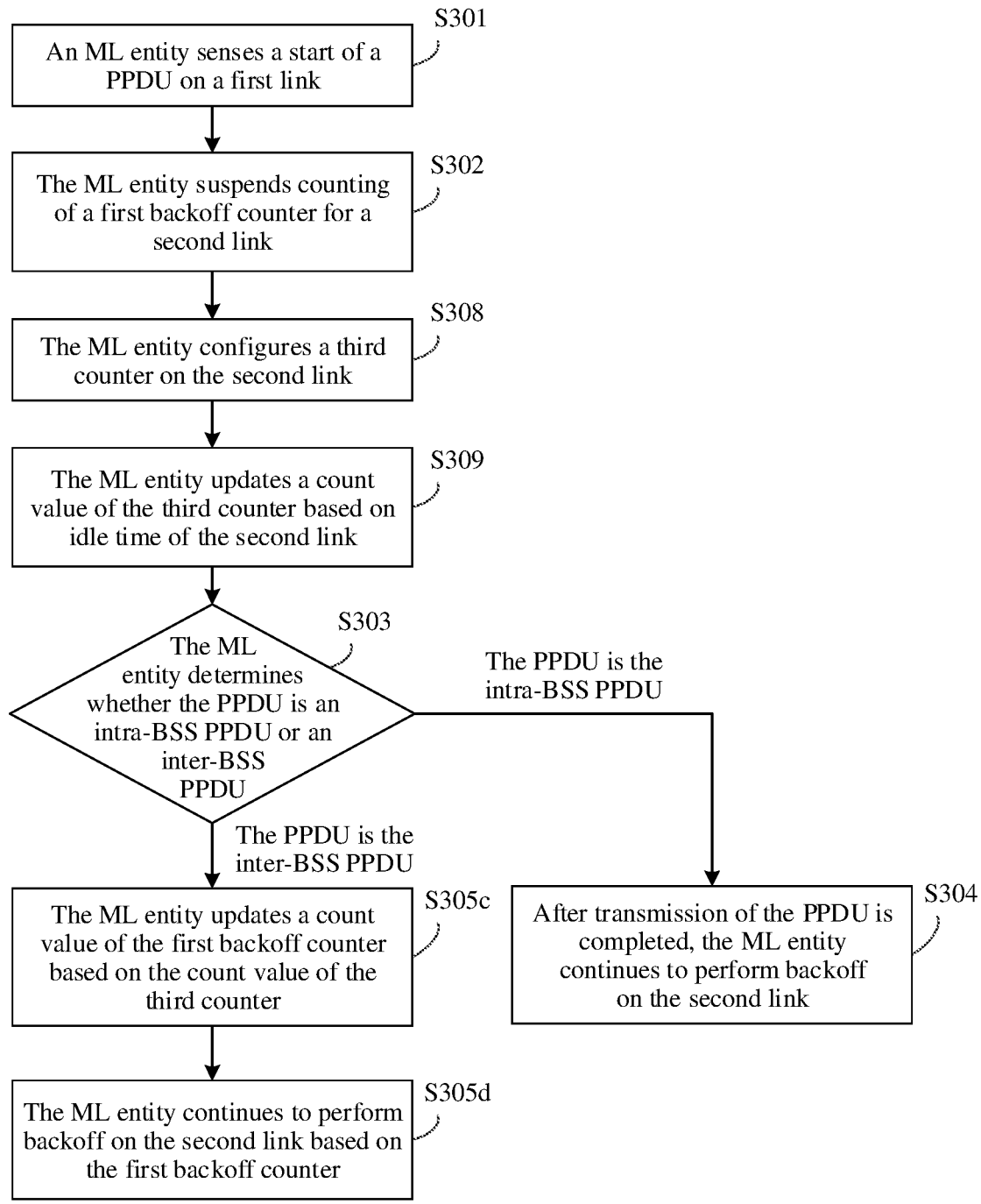
FIG. 18 is a flowchart of another communication protection method according to an embodiment of this application.

In an optional embodiment, according to the technical solution shown in FIG. 15, as shown in FIG. 18, after step S302, the communication protection method further includes steps S308 and S309. In addition, step S305 may be replaced with steps S305c and S305d.

S308: The ML entity sets a third counter for the second link.

The third counter is configured to record the idle time of the second link. An initial value of the third counter may be 0.

S309: The ML entity updates a count value of the third counter based on the idle time of the second link.

In an implementation, each time the second link is in the idle state in one slot, the ML entity adds 1 to the count value of the third counter.

S305c: When the PPDU is the inter-BSS PPDU, the ML entity sets the count value of the first backoff counter based on the count value of the third counter.

Optionally, if a value obtained by subtracting the count value of the third counter from the current value of the first backoff counter is greater than or equal to 0, the count value of the first backoff counter is equal to the value obtained by subtracting the count value of the third counter from the current value of the first backoff counter. If the value obtained by subtracting the count value of the third counter from the current value of the first backoff counter is less than 0, the count value of the first backoff counter is 0.

For example, it is assumed that when the ML entity suspends counting of the first backoff counter, the current value of the first backoff counter is 10. If the idle time of the second link reaches 9 slots in a process in which the ML entity determines whether the PPDU is the inter-BSS PPDU, the count value of the third counter is 9. In this way, when determining that the PPDU is the inter-BSS PPDU, the ML entity may set the count value of the first backoff counter to 1.

For another example, it is assumed that when the ML entity suspends counting of the first backoff counter, the current value of the first backoff counter is 10. If the idle time of the second link reaches 12 slots in a process in which the ML entity determines whether the PPDU is the inter-BSS PPDU, the count value of the third counter is 12. In this way, when determining that the PPDU is the inter-BSS PPDU, the ML entity may set the count value of the first backoff counter to 0.

S305d: The ML entity continues to perform backoff on the second link based on the first backoff counter.

In an implementation, the station of the ML entity on the second link resumes the counting function of the first backoff counter for the second link, and continues to perform backoff.

Optionally, after the fourth moment, each time the second link is in the idle state in one slot, the count value of the first backoff counter for the second link is subtracted by 1 until the count value of the first backoff counter for the second link is 0.

The fourth moment is a moment at which the ML entity determines that the PPDU is the inter-BSS PPDU.

Optionally, regardless of whether the second link is always in the idle state in the second interframe space before the fourth moment, provided that the second link is in the idle state at the fourth moment, each time the second link is in the idle state in one slot, the count value of the first backoff counter for the second link is subtracted by 1 until the count value of the first backoff counter of the second link is 0.

Figure 16G:
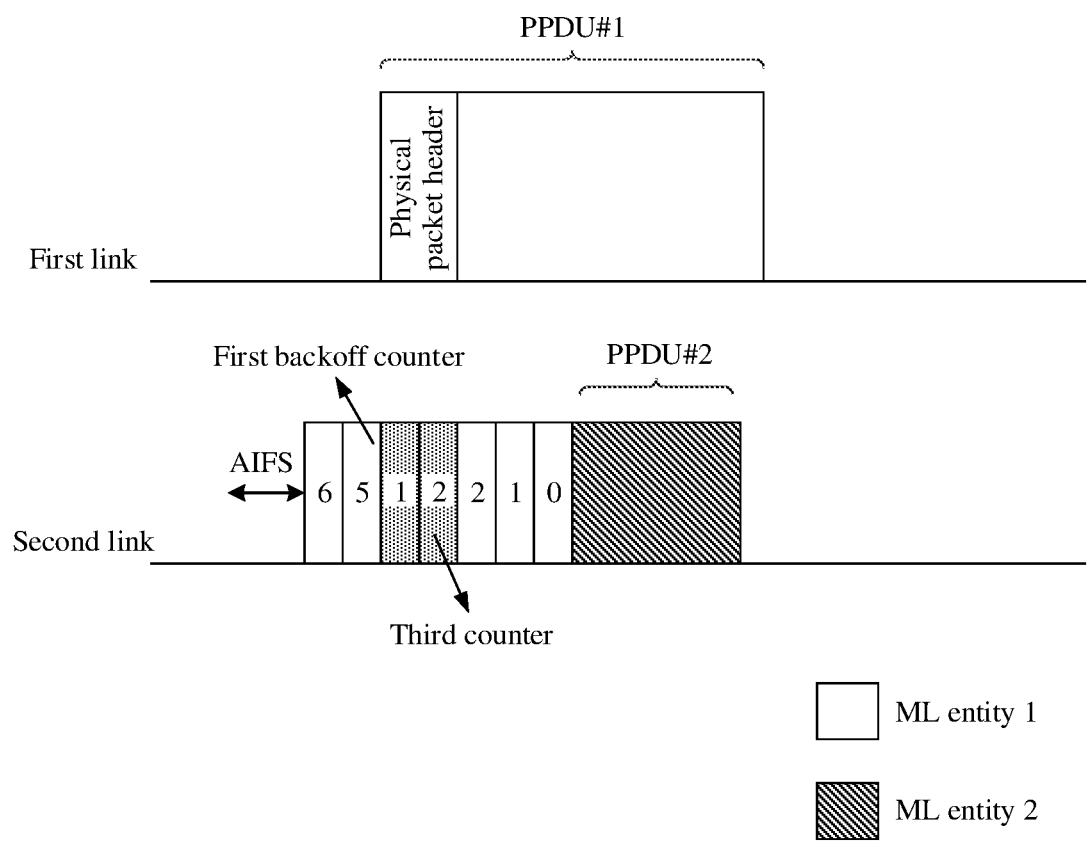
FIG. 16(g) is a schematic diagram of another ML communication scenario according to an embodiment of this application.

Refer to FIG. 16(g). An example is used to describe the technical solution shown in FIG. 18. As shown in FIG. 16(g), an ML entity 1 sends a PPDU #1 on the first link. When an ML entity 2 senses a start of the PPDU #1 on the first link, the ML entity 2 suspends counting of the first backoff counter for the second link. In this case, the count value of the first backoff counter is 5. In addition, the ML entity 2 configures the third counter for the second link. In two slots in which the ML entity 2 senses a physical packet header of the PPDU #1 on the first link, the second link is in the idle state. Therefore, the count value of the third counter is updated to 2. After sensing the physical packet header of the PPDU #1 on the second link, the ML entity 2 determines that the PPDU #1 is the inter-BSS PPDU. In this case, the ML entity 2 updates the count value of the first backoff counter to 3 based on the count value of the third backoff counter. The ML entity 2 continues to perform backoff based on the first backoff counter whose count value is 3. After the count value of the first backoff counter decreases to 0, the ML entity 2 sends a PPDU #2 on the second link.

According to the technical solution shown in FIG. 18, after the ML entity senses the start of the PPDU on the first link, the ML entity suspends counting of the first backoff counter for the second link. In addition, the ML entity configures the third counter, and records the idle time of the second link by using the third counter. When the ML entity determines that the PPDU is the inter-BSS PPDU, the ML entity updates the count value of the first backoff counter based on the count value of the third counter, so that the first backoff counter is not affected by the previous suspension. In this way, when the PPDU is the inter-BSS PPDU, the backoff procedure of the ML entity on the second link is not affected. This avoids that the ML entity is at a disadvantage in channel contention, and ensures that the ML entity uses the second link.

Figure 19:
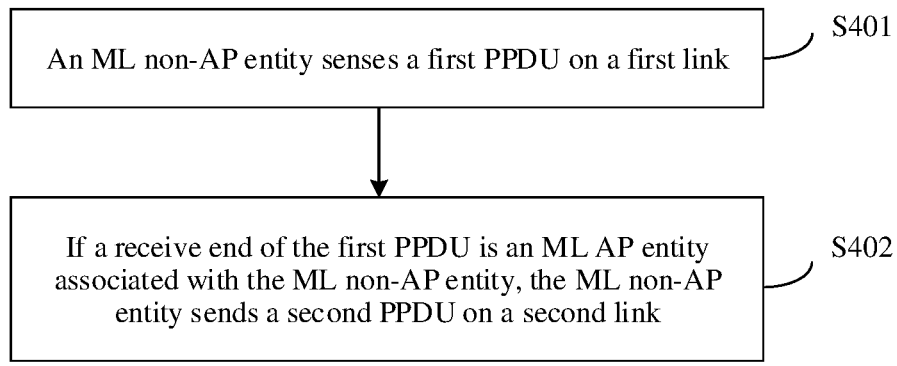
FIG. 19 is a flowchart of a communication protection method according to an embodiment of this application.

FIG. 19 shows a communication protection method according to an embodiment of this application. The method includes the following steps.

S401: An ML non-AP entity senses a first PPDU on a first link.

The ML non-AP entity supports a plurality of links. The first link is any one of the plurality of links supported by the ML non-AP entity.

Optionally, the first PPDU may be any one of a single-user (SU) PPDU, an extended-range (ER) SU PPDU, a trigger-based (TB) PPDU, or an uplink multi-user (MU) PPDU.

In an implementation, a station of the ML non-AP entity on the first link senses the first PPDU on the first link.

After sensing the first PPDU, the station determines whether a receive end of the first PPDU is an ML AP entity associated with the ML non-AP entity. For example, if a BSS color in a SIG field of the first PPDU is the same as a BSS color of a BSS to which the station of the ML non-AP entity on the first link belongs, and a UL/DL parameter in the SIG field of the first PPDU is used to indicate that the first PPDU is used for uplink transmission, the receive end of the first PPDU is the ML AP entity associated with the ML non-AP entity.

S402: If the receive end of the first PPDU is the ML AP entity associated with the ML non-AP entity, the ML non-AP entity sends a second PPDU on a second link.

The second link is another link in the plurality of links supported by the ML non-AP entity other than the first link.

In this embodiment of this application, an end moment of the second PPDU is the same as an end moment of the first PPDU, to ensure that the ML AP entity associated with the ML non-AP entity can simultaneously receive a PPDU and send a BA frame on the first link and the second link.

To ensure that the end moment of the second PPDU may be the same as the end moment of the first PPDU, the ML non-AP entity may determine a transmission time length of the second PPDU based on a transmission time length of the first PPDU. Specifically, the ML non-AP entity determines the transmission time length of the second PPDU based on a start moment of the first PPDU, the transmission time length of the first PPDU, and a start moment of the second PPDU. The start moment of the first PPDU is a moment at which the ML non-AP entity senses an L-STF of the first PPDU on the first link. The start moment of the second PPDU is determined by the ML non-AP entity itself. The transmission time length of the first PPDU may be determined based on an L-SIG field of the first PPDU.

For example, the L-SIG field of the first PPDU includes a RATE field and a LENGTH field. The RATE field is used to indicate a transmission rate of the first PPDU. The LENGTH field is used to indicate a data length of the first PPDU. Based on the RATE field and the LENGTH field, a time length from an end moment of the L-SIG field to the end moment of the first PPDU may be calculated. For a specific calculation manner of the time length, refer to the conventional technology.

It should be understood that the transmission time length of the first PPDU includes: a time length from the start moment of the first PPDU to the end moment of the L-SIG field of the first PPDU, and the time length from the end moment of the L-SIG field to the end moment of the first PPDU.

It should be understood that, based on that the end moment of the first PPDU is the same as the end moment of the second PPDU, the ML non-AP entity may determine the start moment of the second PPDU and values of a RATE field and a LENGTH field in the second PPDU based on the transmission time length of the second PPDU.

In an implementation, a station of the ML non-AP entity on the second link learns, from the station on the first link, that the receive end of the first PPDU is the ML AP entity associated with the ML non-AP entity. Then, the station of the ML non-AP entity on the second link sends the second PPDU on the second link.

Optionally, that the ML non-AP entity sends a second PPDU on a second link further includes: The ML non-AP entity performs a backoff procedure on the second link; and the ML non-AP entity sends the second PPDU on the second link after the backoff procedure ends. For the foregoing backoff procedure, refer to the conventional technology. Details are not described herein.

Figure 20:
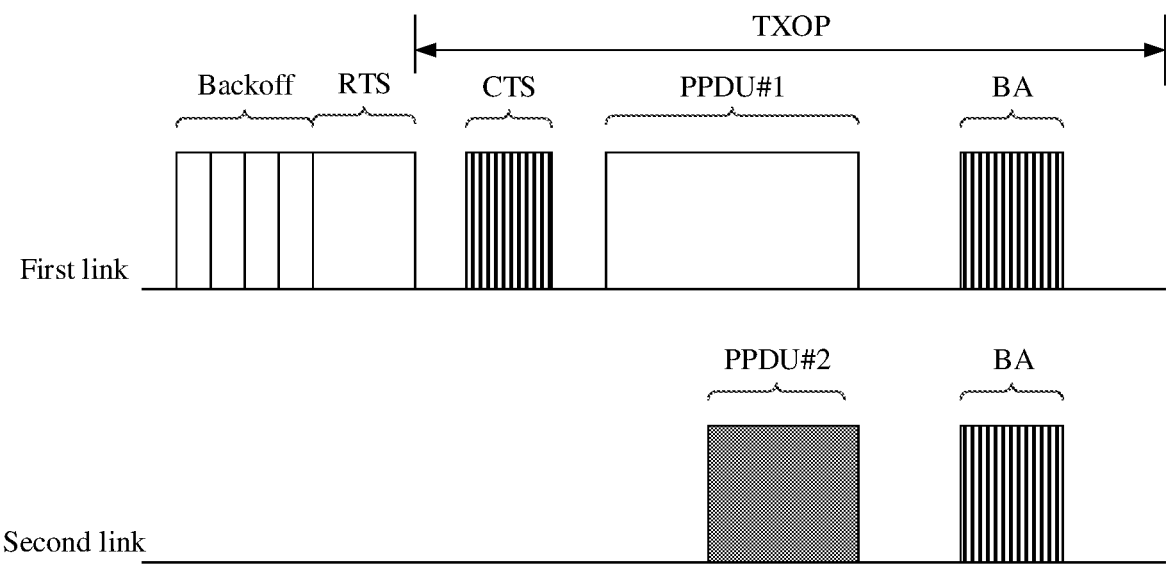
FIG. 20 is a schematic diagram of another ML communication scenario according to an embodiment of this application.

Refer to FIG. 20. An example is used for description. An ML non-AP entity 1 sends an RTS frame on the first link after the backoff procedure ends, to establish a TXOP. Then, the ML non-AP entity 1 sends a PPDU #1 to an ML AP entity on the first link. An ML non-AP entity 2 senses the PPDU #1. After the ML non-AP entity 2 determines that the PPDU #1 is sent to the ML AP entity associated with the ML non-AP entity 2, the ML non-AP entity 2 sends a PPDU #2 on the second link. An end moment of the PPDU #2 is the same as an end moment of the PPDU #1. In this way, the ML AP entity may send a BA frame of the PPDU #1 on the first link and a BA frame of the PPDU #2 on the second link at a same moment.

According to the technical solution shown in FIG. 19, if the ML non-AP entity senses the first PPDU on the first link, and the first PPDU is sent to the ML AP entity associated with the ML non-AP entity, the ML non-AP entity sends the second PPDU on the second link. Because the end moment of the second PPDU is the same as the end moment of the first PPDU, the ML AP entity may send a BA frame of the second PPDU and a BA frame of the first PPDU at the same moment. This avoids a case in which the ML AP entity sends a signal on one link and receives a signal on another link. In addition, the ML non-AP entity sends the second PPDU on the second link, and this helps improve utilization of the second link.

The foregoing mainly describes the solutions provided in the embodiments of this application from a perspective of the ML entity. It may be understood that to implement the foregoing functions, the ML entities include corresponding hardware structures and/or software modules for performing each function. A person skilled in the art should be easily aware that, in combination with the examples of units and algorithm steps described in the embodiments disclosed in this specification, this application may be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

In the embodiments of this application, the apparatus may be divided into functional modules based on the foregoing method examples. For example, each functional module may be obtained through division based on a corresponding function, or two or more functions may be integrated into one processing module. The integrated module may be implemented in a form of hardware, or may be implemented in a form of a software functional module. It should be noted that, in the embodiments of this application, division into the modules is an example, and is merely a logical function division. In an actual implementation, another division manner may be used. An example in which each functional module is obtained through division based on each corresponding function is used below for description.

Figure 21:
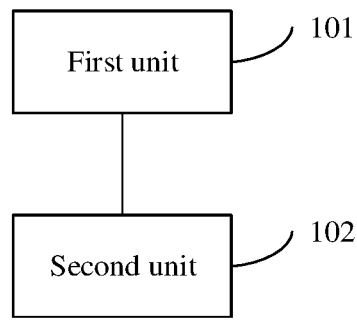
FIG. 21 is a schematic diagram of a structure of an ML entity according to an embodiment of this application.

FIG. 21 is a schematic diagram of a structure of an ML entity according to an embodiment of this application. As shown in FIG. 21, the ML entity includes a first unit 101 and a second unit 102.

Solution 1

The first unit 101 is configured to sense a first PPDU on a first link. The second unit 102 is configured to: if the first PPDU is an intra-BSS PPDU, and a value of a duration field of the first PPDU is greater than a value of a target NAV of a second link, update the value of the target NAV of the second link to the value of the duration field of the first PPDU. The second link is any one of a plurality of links supported by the ML entity other than the first link.

In a possible design, the second unit 102 is configured not to: if the first PPDU is an inter-BSS PPDU, update the value of the target NAV of the second link; or if the first PPDU is the intra-BSS PPDU, and the value of the duration field of the first PPDU is less than or equal to the value of the target NAV of the second link, update the value of the target NAV of the second link.

In a possible design, the first unit 101 is further configured to sense a CF-End frame on the first link. The second unit 102 is configured to: when the CF-End frame is the intra-BSS PPDU, and the value of the target NAV of the second link is updated based on the value of the duration field of the first PPDU, set the value of the target NAV of the second link to 0.

In a possible design, the second unit 102 is configured to: when the first unit 101 senses no second PPDU on the first link within a preset time length, and the value of the target NAV of the second link is updated based on the value of the duration field of the first PPDU, reset the target NAV of the second link. The second PPDU and the first PPDU are from a same station.

In a possible design, the second unit 102 is specifically configured to: set the value of the target NAV of the second link to 0, or set the value of the target NAV of the second link to a first value. An end moment determined by the first value is the same as an end moment determined by a second value, and the second value is a value of the target NAV before the target NAV is updated based on the value of the duration field of the first PPDU.

In a possible design, the preset time length=(2*aSIFS-Time)+(a transmission time length of a first PPDU response frame)+aRxPHYStartDelay+(2*aSlotTime). aSIFSTime represents a time length of SIFS. aRxPHYStartDelay represents a time length of a preset delay. aSlotTime represents a time length of one slot.

In a possible design, the first PPDU carries an RTS frame, and a response frame is a CTS frame.

In a possible design, if the ML entity is an ML non-AP entity, the target NAV includes one of the following cases: (1) If the ML non-AP entity configures an intra-BSS NAV and a basic NAV of the second link, the target NAV is the intra-BSS NAV; and (2) if the ML non-AP entity configures an intra-BSS NAV, a basic NAV, and a first NAV of the second link, the target NAV is the first NAV.

In a possible design, if the ML entity is an ML AP entity, the target NAV includes one of the following cases: (1) If the ML AP entity configures an intra-BSS NAV and a basic NAV of the second link, the target NAV is the intra-BSS NAV; (2) if the ML AP entity configures only an intra-BSS NAV, a basic NAV, and a first NAV of the second link, the target NAV is the first NAV; and (3) if the ML AP entity configures the first NAV and a second NAV of the second link, the target NAV is the first NAV.

Solution 2

The first unit 101 is configured to send a first PPDU on a first link. The first PPDU includes a duration field, and the duration field included in the first PPDU is used to indicate a time length of a first time period. The second unit 102 is configured to send a MAC frame on a second link. The MAC frame is used to indicate a time length of a second time period, an end moment of the first time period is the same as an end moment of the second time period, an intra-BSS station on the second link is prohibited from sending a second PPDU in the second time period, and the second link is any one of a plurality of links supported by the ML entity other than the first link.

In a possible design, the MAC frame is a notification frame or a QTP frame.

In a possible design, a value of a duration field of the notification frame is equal to the time length of the second time period, the duration field of the notification frame is used to set a value of an NAV maintained by the intra-BSS station, and the duration field of the notification frame is not used to set a value of an NAV maintained by an OBSS station.

In a possible design, the notification frame includes a duration field and a time length field, the time length field is used to set a value of an NAV maintained by the intra-BSS station, a value of the duration field is 0, and a value of the time length field is equal to the time length of the second time period.

Solution 3

The first unit 101 is configured to sense a start of a PPDU on a first link. The second unit 102 is configured to stop counting of a first backoff counter for a second link. The second link is any one of a plurality of links supported by the ML entity other than the first link. The first unit 101 is further configured to determine whether the PPDU is an intra-BSS PPDU or an inter-BSS PPDU. The second unit 102 is further configured to: when the PPDU is the intra-BSS PPDU, continue to perform backoff on the second link after transmission of the PPDU is completed; and when the PPDU is the inter-BSS PPDU, continue to perform backoff on the second link.

In a possible design, the second unit 102 is specifically configured to perform backoff on the second link after a first moment, where the first moment is an end moment of the transmission of the PPDU; perform backoff on the second link after a second moment, where the second moment is an end moment of transmission of a response frame corresponding to the PPDU; or perform backoff on the second link after a third moment, where the third moment is an end moment determined by a duration field of the PPDU.

In a possible design, the second unit 102 is further configured to: configure a second backoff counter for the second link, where an initial value of the second backoff counter is a current value of the first backoff counter; if the second link is in an idle state at a current moment, subtract a count value of the second backoff counter by 1 each time the second link is in the idle state in one slot; or if the second link is in a busy state at a current moment, wait for idle time of the second link to reach second interframe space, and after the idle time of the second link reaches the second interframe space, subtract a count value of the second backoff counter by 1 each time the second link is in an idle state in one slot.

In a possible design, the second unit 102 is further configured to maintain the count value of the second backoff counter as 0 after the count value of the second backoff counter decreases to 0.

In a possible design, the second unit 102 is further configured to reset the count value of the second backoff counter when the count value of the second backoff counter decreases to 0.

In a possible design, the second unit 102 is further configured to: reset the count value of the second backoff counter based on a doubled contention window, reset the count value of the second backoff counter based on a contention window, or reset the count value of the second backoff counter based on a minimum value of a contention window.

In a possible design, the second unit 102 is specifically configured to: when the PPDU is the inter-BSS PPDU, update a count value of the first backoff counter to the count value of the second backoff counter, and continue to perform backoff on the second link based on the first backoff counter.

Solution 4

The first unit 101 is configured to sense a first PPDU on a first link. The second unit 102 is configured to: when a receive end of the first PPDU is an ML AP entity associated with the ML entity, send a second PPDU on a second link. The second link is any one of a plurality of links supported by an ML non-AP entity other than the first link, and an end moment of the first PPDU is the same as an end moment of the second PPDU.

In a possible design, the second unit 102 is specifically configured to: perform a backoff procedure on the second link; and send the second PPDU on the second link after the backoff procedure performed on the second link ends.

The ML entity provided in the embodiments of this application may be implemented in a plurality of product forms. For example, the ML entity may be configured as a general-purpose processing system. For another example, the ML entity may be implemented by using a general bus architecture. For another example, the ML entity may be implemented by using an application specific integrated circuit (ASIC). The following provides several possible product forms of the ML entity described in the embodiments of this application. It should be understood that, the following product forms are merely examples, and the possible product forms of the ML entity described in the embodiments of this application are not limited.

Figure 22:
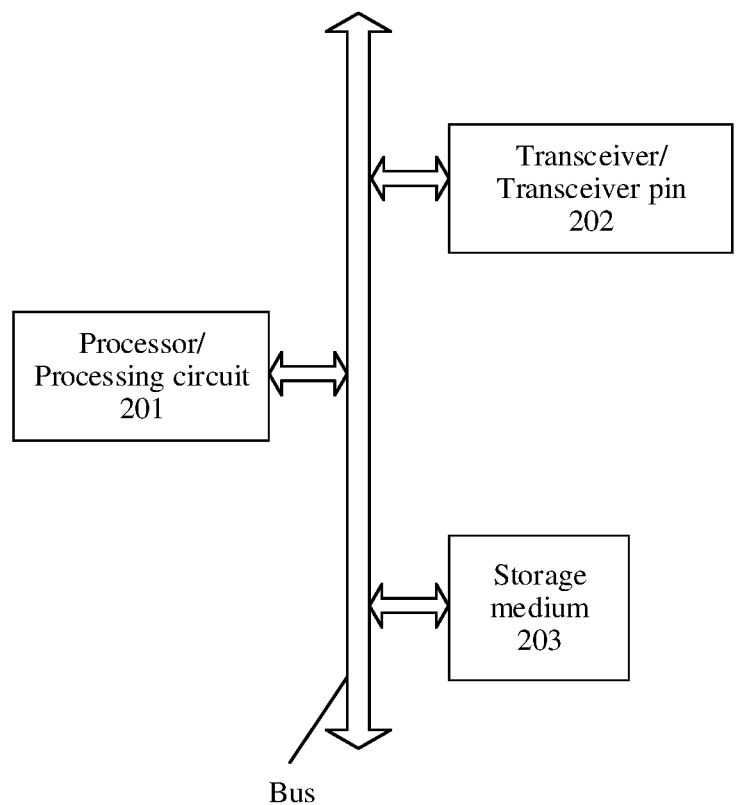
FIG. 22 is a schematic diagram of a structure of an ML entity according to an embodiment of this application.

FIG. 22 is a result diagram of a possible product form of an ML entity according to an embodiment of this application.

In a possible product form, the ML entity in this embodiment of this application may be a communication device, and the communication device includes a processor 201 and a transceiver 202. Optionally, the communication device further includes a storage medium 203.

The processor 201 is configured to perform steps S102, S103, S104, and S105 in FIG. 6; step S107 in FIG. 8; step S108 in FIG. 9; steps S302 to S305 in FIG. 15; steps S306, S307, S305a, and S305b in FIG. 17; and steps S308, S309, S305c, and S305d in FIG. 18. The transceiver 202 is configured to perform step S101 in FIG. 6, step S106 in FIG. 8, steps S201 and S202 in FIG. 10, step S301 in FIG. 15, and steps S401 and S402 in FIG. 19.

In another possible product form, the ML entity described in this embodiment of this application may alternatively be implemented by a general-purpose processor or a special-purpose processor that is commonly referred to as a chip. The chip includes a processing circuit 201 and a transceiver pin 202. Optionally, the chip may further include a storage medium 203.

The processing circuit 201 is configured to perform steps S102, S103, S104, and S105 in FIG. 6; step S107 in FIG. 8; step S108 in FIG. 9; steps S302 to S305 in FIG. 15; steps S306, S307, S305a, and S305b in FIG. 17; and steps S308, S309, S305c, and S305d in FIG. 18. The transceiver pin 202 is configured to perform step S101 in FIG. 6, step S106 in FIG. 8, steps S201 and S202 in FIG. 10, step S301 in FIG. 15, and steps S401 and S402 in FIG. 19.

An embodiment of this application further provides a computer-readable storage medium. The computer-readable storage medium stores computer instructions. When the computer-readable storage medium is run on an ML entity, the ML entity performs the method shown in FIG. 6, FIG. 8, FIG. 9, FIG. 10, FIG. 15, FIG. 17, FIG. 18, or FIG. 19. The computer instructions may be stored in the computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium, a semiconductor medium (for example, a solid-state drive (SSD)), or the like.

An embodiment of this application further provides a computer program product including computer instructions. When the computer program product runs on an ML entity, the ML entity can perform the method shown in FIG. 6, FIG. 8, FIG. 9, FIG. 10, FIG. 15, FIG. 17, FIG. 18, or FIG. 19.

Although this application is described with reference to the embodiments, in a process of implementing this application that claims protection, a person skilled in the art may understand and implement another variation of the disclosed embodiments by viewing the accompanying drawings, disclosed content, and the accompanying claims. In the claims, "comprising" (comprising) does not exclude another component or another step, and "a" or "one" does not exclude a meaning of plurality. A single processor or another unit may implement several functions enumerated in the claims. Some measures are recorded in dependent claims that are different from each other, but this does not mean that the measures cannot be combined to produce a good effect.

Although this application is described with reference to specific features and the embodiments thereof, it is clearly that various modifications and combinations may be made to them without departing from the spirit and scope of this application. Correspondingly, the specification and accompanying drawings are merely descriptions of examples of this application defined by the appended claims, and are considered as any of or all modifications, variations, combinations, or equivalents that cover the scope of this application. Obviously, a person skilled in the art can make various modifications and variations to this application without departing from the spirit and scope of this application. This application is intended to cover these modifications and variations of this application provided that they fall within the scope of the claims of this application and their equivalent technologies.

What is claimed is:

1. A method, comprising:
    sensing, by a multi-link (ML) entity, a first physical layer protocol data unit (PPDU) on a first link of a plurality of links supported by the ML entity; and
    performing the following:
        when the first PPDU is an intra-basic service set (intra-BSS) PPDU, and a value of a duration field of the first PPDU is greater than a value of a target network allocation vector (NAV) of a second link of the plurality of links, updating, by the ML entity, the value of the target NAV of the second link to the value of the duration field of the first PPDU, wherein the second link is any of the plurality of links supported by the ML entity other than the first link;
        when the first PPDU is an inter-basic service set (inter-BSS) PPDU, skipping updating, by the ML entity, the value of the target NAV of the second link; or
        when the first PPDU is an intra-BSS PPDU, and the value of the duration field of the first PPDU is less than or equal to the value of the target NAV of the second link, skipping updating, by the ML entity, the value of the target NAV of the second link.

2. The method according to claim 1, further comprising:
    sensing, by the ML entity, a contention-free end (CF-End) frame on the first link; and
    when the CF-End frame is an intra-BSS PPDU, and the value of the target NAV of the second link is updated based on the value of the duration field of the first PPDU, setting, by the ML entity, the value of the target NAV of the second link to zero (0).

3. The method according to claim 1, further comprising:
    when the ML entity senses no second PPDU on the first link within a preset time length after sensing the first PPDU, and the value of the target NAV of the second link is updated based on the value of the duration field of the first PPDU, resetting, by the ML entity, the target NAV of the second link, wherein the second PPDU and the first PPDU correspond to a same station.

4. The method according to claim 3, wherein resetting, by the ML entity, the target NAV of the second link comprises:
setting, by the ML entity, the value of the target NAV of the second link to zero (0); or
setting, by the ML entity, the value of the target NAV of the secondlink to a first value, wherein an end moment determined by the first value is the same as an end moment determined by a second value, and the second value is a value of the target NAV before the target NAV is updated based on the value of the duration field of the first PPDU.

5. The method according to claim 3, wherein the preset time length =(2* aSIFSTime)+(a transmission time length of a first PPDU response frame)+aRxPHYStartDelay+(2*aSlotTime), wherein
aSIFSTime represents a time length of short interframe space (SIFS), aRxPHYStartDelay represents a time length of a preset delay, and aSlotTime represents a time length of one slot.

6. The method according to claim 5, wherein the first PPDU carries a request to send (RTS) frame, and the first PPDU response frame is a clear to send (CTS) frame.

7. The method according to claim 1, wherein the ML entity is an ML non-access point (non-AP) entity, and the target NAV meets one of the following cases:
the ML non-AP entity configures an intra-BSS NAV and a basic NAV of the second link, and the target NAV is the intra-BSS NAV; or
the ML non-AP entity configures an intra-BSS NAV, a basic NAV, and a first NAV of the second link, and the target NAV is the first NAV.

8. The method according to claim 1, wherein the ML entity is an ML access point (AP) entity, and the target NAV meets of the following cases:
the ML AP entity configures an intra-BSS NAV and a basic NAV of the second link, and the target NAV is the intra-BSS NAV;
the ML AP entity configures only an intra-BSS NAV, a basic NAV, and a first NAV of the second link, and the target NAV is the first NAV; or
the ML AP entity configures the first NAV and a second NAV of the second link, and the target NAV is the first NAV.

9. A multi-link (ML) entity, comprising:
a processor; and
a transceiver connected to the processor, wherein the transceiver is configured to sense a first physical layer protocol data unit (PPDU) on a first link of a plurality of links supported by the ML entity; and
wherein the processor is configured to:
when the first PPDU is an intra-basic service set (intra-BSS) PPDU and a value of a duration field of the first PPDU is greater than a value of a target network allocation vector (NAV) of a second link of the plurality of links, update the value of the target NAV of the second link to the value of the duration field of the first PPDU, wherein the second link is any of the plurality of links supported by the ML entity other than the first link;
when the first PPDU is an inter-basic service set (inter-BSS) PPDU, skip updating the value of the target NAV of the second link; or when the first PPDU is the intra-BSS PPDU, and the value of the duration field of the first PPDU is less than or equal to the value of the target NAV of the second link, skip updating the value of the target NAV of the second link.

10. The ML entity according to claim 9, wherein:
the transceiver is further configured to sense a contention-free end (CF-End) frame on the first link; and
the processor is further configured to:
when the CF-End frame is an intra-BSS PPDU and the value of the target NAV of the second link is updated based on the value of the duration field of the first PPDU, set the value of the target NAV of the second link to 0.

11. The ML entity according to claim 9, wherein the processor is further configured to:
when the transceiver senses no second PPDU on the first link within a preset time length and the value of the target NAV of the second link is updated based on the value of the duration field of the first PPDU, reset the target NAV of the second link, wherein the second PPDU and the first PPDU correspond to a same station.

12. The ML entity according to claim 11, wherein resetting the target NAV of the second link comprises:
setting the value of the target NAV of the second link to zero (0); or
setting the value of the target NAV of the second link to a first value, wherein an end moment determined by the first value is the same as an end moment determined by a second value, and the second value is a value of the target NAV before the target NAV is updated based on the value of the duration field of the first PPDU.

13. The ML entity according to claim 11, wherein the preset time length=(2*aSIFSTime)+(a transmission time length of a first PPDU response frame)+aRxPHYStartDelay+(2*aSlotTime), wherein
aSIFSTime represents a time length ofshort interframe space (SIFS), aRxPHYStartDelay represents a time length of a preset delay, and aSlotTime represents a time length of one slot.

14. The ML entity according to claim 13, wherein the first PPDU carries a request to send (RTS) frame, and the first PPDU response frame is a clear to send (CTS) frame.

15. The ML entity according to claim 9, wherein the ML entity is an ML non-access point (non-AP) entity, and the target NAV meets one of the following cases:
the ML non-AP entity configures an intra-BSS NAV and a basic NAV of the second link, and the target NAV is the intra-BSS NAV; or
the ML non-AP entity configures an intra-BSS NAV, a basic NAV, and a first NAV of the second link, and the target NAV is the first NAV.

16. The ML entity according to claim 9, wherein the ML entity is an ML access point (AP) entity, and the target NAV meets one of the following cases:
the ML AP entity configures an intra-BSS NAV and a basic NAV of the second link, and the target NAV is the intra-BSS NAV;
the ML AP entity configures only an intra-BSS NAV, a basic NAV, and a first NAV of the second link, and the target NAV is the first NAV; or
the ML AP entity configures the first NAV and a second NAV of the second link, and the target NAV is the first NAV.

17. A non-transitory computer-readable storage medium, wherein the non-transitory computer-readable storage medium comprises computer instructions, and when the computer instructions are run on a computer, the computer is caused to perform the following:

sensing a first physical layer protocol data unit (PPDU) on a first link of a plurality of links supported by a multi-link (ML) entity; and performing the following:

when the first PPDU is an intra-basic service set (intra-BSS) PPDU, and a value of a duration field of the first PPDU is greater than a value of a target network allocation vector (NAV) of a second link of the plurality of links, updating the value of the target NAV of the second link to the value of the duration field of the first PPDU, wherein the second link is any of the plurality of links supported by the ML entity other than the first link;

when the first PPDU is an inter-basic service set (inter-BSS) PPDU, skipping updating the value of the target NAV of the second link; or when the first PPDU is the intra-BSS PPDU, and the value of the duration field of the first PPDU is less than or equal to the value of the target NAV of the second link, skipping updating the value of the target NAV of the second link.

\* \* \* \* \*

UNITED STATES PATENT AND TRADEMARK OFFICE
CERTIFICATE OF CORRECTION

| | | |
|---|---|---|
| PATENT NO. | : 11,665,264 B2 | |
| APPLICATION NO. | : 17/646962 | |
| DATED | : May 30, 2023 | |
| INVENTOR(S) | : Li et al. | |

It is certified that error appears in the above-identified patent and that said Letters Patent is hereby corrected as shown below:

On the Title Page

Item (54), in Column 1, in "Title", Line 2, delete "COMMMUNICATION" and insert -- COMMUNICATION --, therefor.

Item (57), in Column 2, under "Abstract", Line 1, delete "fink;" and insert -- link; --, therefor.

In the Specification

In Column 1, Line 2, delete "COMMMUNICATION" and insert -- COMMUNICATION --, therefor.

In the Claims

In Column 33, in Claim 4, Line 10, delete "secondlink" and insert -- second link --, therefor.

In Column 33, in Claim 8, Line 39, delete "meets of" and insert -- meets one of --, therefor.

In Column 34, in Claim 13, Line 37, delete "ofshort" and insert -- of short --, therefor.

Signed and Sealed this
Eighth Day of August, 2023

*Katherine Kelly Vidal*
Katherine Kelly Vidal
*Director of the United States Patent and Trademark Office*